United States Patent
Rahman et al.

(10) Patent No.: US 11,184,865 B2
(45) Date of Patent: Nov. 23, 2021

(54) CAPABILITY SIGNALING TO ENABLE FULL POWER UPLINK TRANSMISSION

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/850,782

(22) Filed: Apr. 16, 2020

(65) Prior Publication Data

US 2020/0336998 A1   Oct. 22, 2020

Related U.S. Application Data

(60) Provisional application No. 62/938,631, filed on Nov. 21, 2019, provisional application No. 62/938,030, (Continued)

(51) Int. Cl.
*H04B 7/0456* (2017.01)
*H04W 52/42* (2009.01)
(Continued)

(52) U.S. Cl.
CPC .......... *H04W 52/42* (2013.01); *H04B 7/0465* (2013.01); *H04W 8/24* (2013.01); *H04W 52/146* (2013.01); *H04W 72/1289* (2013.01)

(58) Field of Classification Search
CPC ... H04W 52/146; H04W 80/02; H04W 52/04; H04W 52/10; H04W 52/325;
(Continued)

(56) References Cited

U.S. PATENT DOCUMENTS

| 2018/0183503 A1 | 6/2018 | Rahman et al. |
| 2019/0097710 A1 | 3/2019 | Park et al. |
| 2019/0312617 A1* | 10/2019 | Wernersson ........ H04L 25/0226 |

OTHER PUBLICATIONS

"3rd Generation Partnership Project; Technical Specification Group Radio Access Network; Evolved Universal Terrestrial Radio Access (E-UTRA); Physical channels and modulation (Release 15)", 3GPP TS 36.211 V15.5.0, Mar. 2019, 238 pages.
(Continued)

*Primary Examiner* — Tu X Nguyen

(57) ABSTRACT

A method for operating a user equipment (UE) is provided. The method comprises transmitting, to a base station (BS), UE capability information including a full power transmission capability of the UE, wherein the full power transmission capability of the UE includes a parameter S to indicate a group of full power transmit precoding matrix indicators (TPMIs); receiving, from the BS, configuration information for a physical uplink shared channel (PUSCH) transmission, wherein the configuration information includes a TPMI; determining the PUSCH transmission; determining a power level for the PUSCH transmission; and transmitting, to the BS, the PUSCH transmission with the determined power level, wherein the power level corresponds to full power based on the TPMI being included in the group of full power TPMIs, and wherein the TPMI indicates a precoding matrix and a number of layers for the PUSCH transmission.

20 Claims, 13 Drawing Sheets

Related U.S. Application Data filed on Nov. 20, 2019, provisional application No. 62/923,817, filed on Oct. 21, 2019, provisional application No. 62/899,916, filed on Sep. 13, 2019, provisional application No. 62/848,201, filed on May 15, 2019, provisional application No. 62/836,980, filed on Apr. 22, 2019.

(51) Int. Cl.
*H04W 52/14* (2009.01)
*H04W 8/24* (2009.01)
*H04W 72/12* (2009.01)

(58) Field of Classification Search
CPC . H04W 52/365; H04W 52/38; H04W 52/545; H04W 52/58; H04W 72/0413; H04W 52/367; H04B 7/0456; H04B 7/0639; H04B 7/0452; H04B 7/0413
See application file for complete search history.

(56) References Cited

OTHER PUBLICATIONS

"3rd Generation Partnership Project;Technical Specification Group Radio Access Network; Evolved Universal Terrestrial Radio Access (E-UTRA); Multiplexing and channel coding (Release 15)", 3GPP TS 36.212 V15.5.0, Mar. 2019, 246 pages.
"3rd Generation Partnership Project; Technical Specification Group Radio Access Network; Evolved Universal Terrestrial Radio Access (E-UTRA); Physical layer procedures (Release 15)", 3GPP TS 36.213 V15.5.0, Mar. 2019, 552 pages.
"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.5.0, Mar. 2019, 131 pages.
"3rd Generation Partnership Project; Technical Specification Group Radio Access Network; Evolved Universal Terrestrial Radio Access (E-UTRA); Radio Resource Control (RRC);Protocol specification (Release 15)", 3GPP TS 36.331 V15.5.0, Mar. 2019, 944 pages.
"3rd Generation Partnership Project; Technical Specification Group Services and System Aspects; Feasibility Study on New Services and Markets Technology Enablers; Stage 1 (Release 14)", 3GPP TR 22.891 V1.2.0, Nov. 2015, 96 pages.
"3rd Generation Partnership Project; Technical Specification Group Radio Access Network; NR; Physical channels and modulation (Release 15)", 3GPP TS 38.211 V15.5.0, Mar. 2019, 96 pages.
"3rd Generation Partnership Project; Technical Specification Group Radio Access Network; NR; Physical layer procedures for control (Release 15)", 3GPP TS 38.213 V15.5.0, Mar. 2019, 104 pages.
"3rd Generation Partnership Project; Technical Specification Group Radio Access Network; NR; Physical layer procedures for data (Release 15)", 3GPP TS 38.214 V15.5.0, Mar. 2019, 103 pages.
"3rd Generation Partnership Project; Technical Specification Group Radio Access Network; NR; Multiplexing and channel coding (Release 15)", 3GPP TS 38.212 V15.5.0, Mar. 2019, 101 pages.
International Search Report of the International Searching Authority in connection with International Application No. PCT/KR2020/005312 dated Jul. 31, 2020, 3 pages.
Huawei et al., "Enhancements on UL MIMO with multiple PAs to allow full power transmission," R1-1903972, 3GPP TSG RAN WG1 Meeting #96bis, Xi'an China, Apr. 8-12, 2019, 7 pages.
Qualcomm Incorporated, "Full Tx power for UL transmissions," R1-1905028, 3GPP TSG RAN WG1 Meeting #96bis, Xi'an, China, Apr. 8-12, 2019, 21 pages.
LG Electronics, "Discussions on full Tx power uplink transmission," R1-1904210, 3GPP TSG RAN WG1 Meeting #96bis, Xi'an, China, Apr. 8-12, 2019, 4 pages.

* cited by examiner

CAPABILITY SIGNALING TO ENABLE FULL POWER UPLINK TRANSMISSION

CROSS-REFERENCE TO RELATED APPLICATIONS AND CLAIM OF PRIORITY

The present application claims priority to U.S. Provisional Patent Application No. 62/836,980 filed on Apr. 22, 2019, U.S. Provisional Patent Application No. 62/848,201, filed on May 15, 2019, U.S. Provisional Patent Application No. 62/899,916 filed on Sep. 13, 2019, U.S. Provisional Patent Application No. 62/923,817 filed on Oct. 21, 2019, U.S. Provisional Patent Application No. 62/938,030 filed on Nov. 20, 2019, and U.S. Provisional Patent Application No. 62/938,631 filed on Nov. 21, 2019. The content of the above-identified patent documents is incorporated herein by reference.

TECHNICAL FIELD

The present disclosure relates generally to full power UL MIMO operation for next generation cellular systems.

BACKGROUND

Understanding and correctly estimating the UL channel between a user equipment (UE) and a gNode B (gNB) is important for efficient and effective wireless communication. In order to correctly estimate the UL channel conditions, the UE may transmit reference signal, e.g., SRS, to the gNB for UL channel measurement. With this UL channel measurement, the gNB is able to select appropriate communication parameters to efficiently and effectively perform wireless data communication with the UE in the UL.

SUMMARY

Embodiments of the present disclosure provide methods and apparatuses for full power UL MIMO operation in an advanced wireless communication system.

In one embodiment, a user equipment (UE) for an uplink (UL) transmission is provided. The UE includes a transceiver configured to transmit, to a base station (BS), UE capability information including a full power transmission capability of the UE, wherein the full power transmission capability of the UE includes a parameter S to indicate a group of full power transmit precoding matrix indicators (TPMIs); and receive, from the BS, configuration information for a physical uplink shared channel (PUSCH) transmission, wherein the configuration information includes a TPMI. The UE further includes a processor operably connected to the transceiver, the processor configured to determine the PUSCH transmission; and determine a power level for the PUSCH transmission. The transceiver is further configured to transmit, to the BS, the PUSCH transmission with the determined power level, where the power level corresponds to full power if the TPMI is included in the group of full power TPMIs, and where the TPMI indicates a precoding matrix and a number of layers for the PUSCH transmission.

In another embodiment, a base station (BS) is provided. The BS includes a transceiver configured to receive, from a user equipment (UE), UE capability information including a full power transmission capability of the UE, wherein the full power transmission capability of the UE includes a parameter S to indicate a group of full power transmit precoding matrix indicators (TPMIs). The BS further includes a processor operably coupled to the transceiver, the processor configured to generate configuration information for a physical uplink shared channel (PUSCH) transmission, wherein the configuration information includes a TPMI. The transceiver is further configured to transmit, to the UE, the configuration information for the PUSCH transmission; and receive, from the UE, the PUSCH transmission, the PUSCH transmission transmitted with a power level, where the power level corresponds to full power if the TPMI is included in the group of full power TPMIs, and where the TPMI indicates a precoding matrix and a number of layers for the PUSCH transmission.

In yet another embodiment, a method for operating a user equipment (UE) is provided. The method comprises transmitting, to a base station (BS), UE capability information including a full power transmission capability of the UE, wherein the full power transmission capability of the UE includes a parameter S to indicate a group of full power transmit precoding matrix indicators (TPMIs); receiving, from the BS, configuration information for a physical uplink shared channel (PUSCH) transmission, wherein the configuration information includes a TPMI; determining the PUSCH transmission; determining a power level for the PUSCH transmission; and transmitting, to the BS, the PUSCH transmission with the determined power level, wherein the power level corresponds to full power based on the TPMI being included in the group of full power TPMIs, and wherein the TPMI indicates a precoding matrix and a number of layers for the PUSCH transmission.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
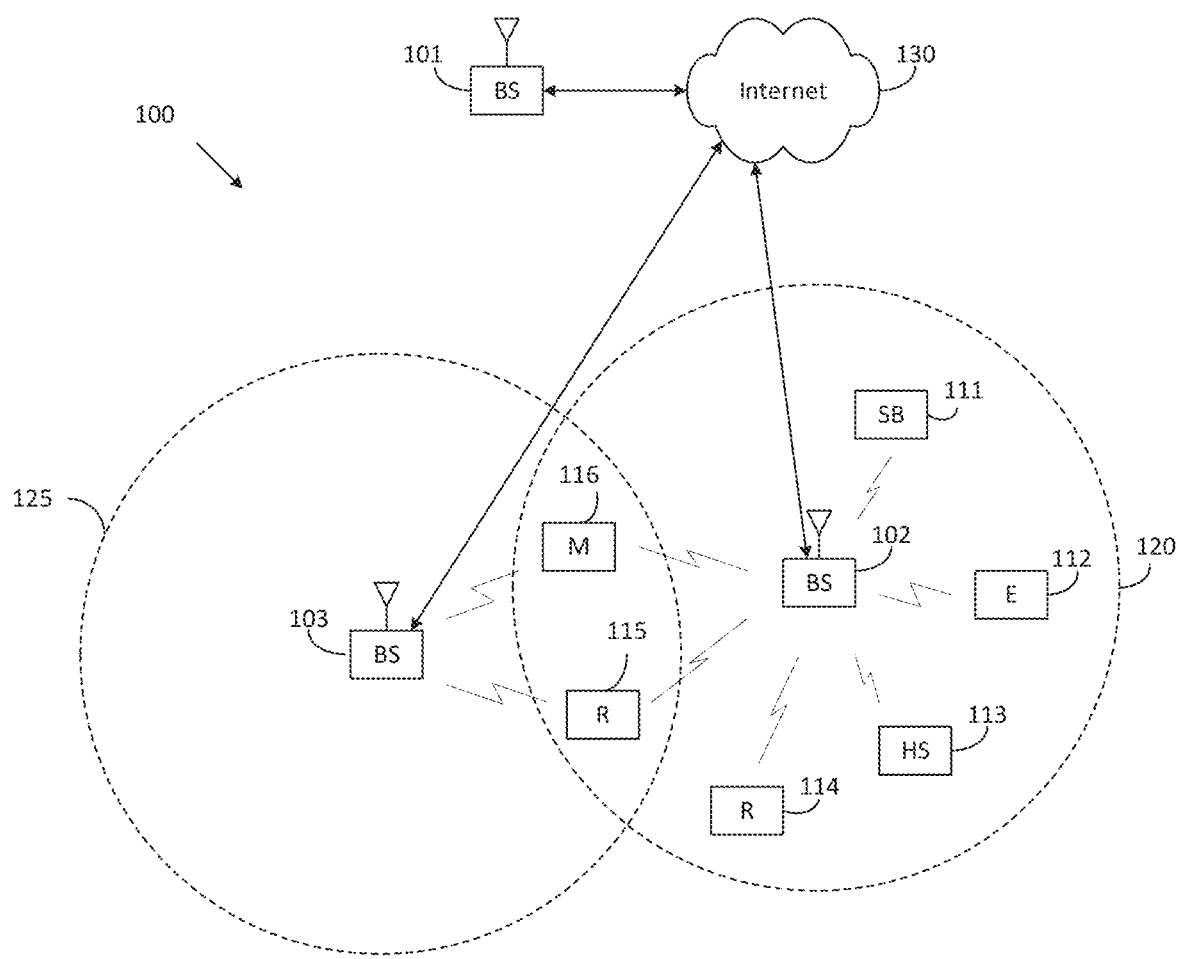
FIG. 1 illustrates an example wireless network according to embodiments of the present disclosure.

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.1.0, "E-UTRA, Physical channels and modulation;" 3GPP TS 36.212 v16.1.0, "E-UTRA, Multiplexing and Channel coding;" 3GPP TS 36.213 v16.1.0, "E-UTRA, Physical Layer Procedures;" 3GPP TS 36.321 v16.1.0, "E-UTRA, Medium Access Control (MAC) protocol specification;" 3GPP TS 36.331 v16.1.0, "E-UTRA, Radio Resource Control (RRC) protocol specification;" 3GPP TR 22.891 v14.2.0; 3GPP TS 38.211 v16.1.0, "E-UTRA, NR, Physical channels and modulation;" 3GPP TS 38.213 v16.1.0, "E-UTRA, NR, Physical Layer Procedures for control;" 3GPP TS 38.214 v16.1.0, "E-UTRA, NR, Physical layer procedures for data;" and 3GPP TS 38.212 v16.1.0, "E-UTRA, NR, Multiplexing and channel coding."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
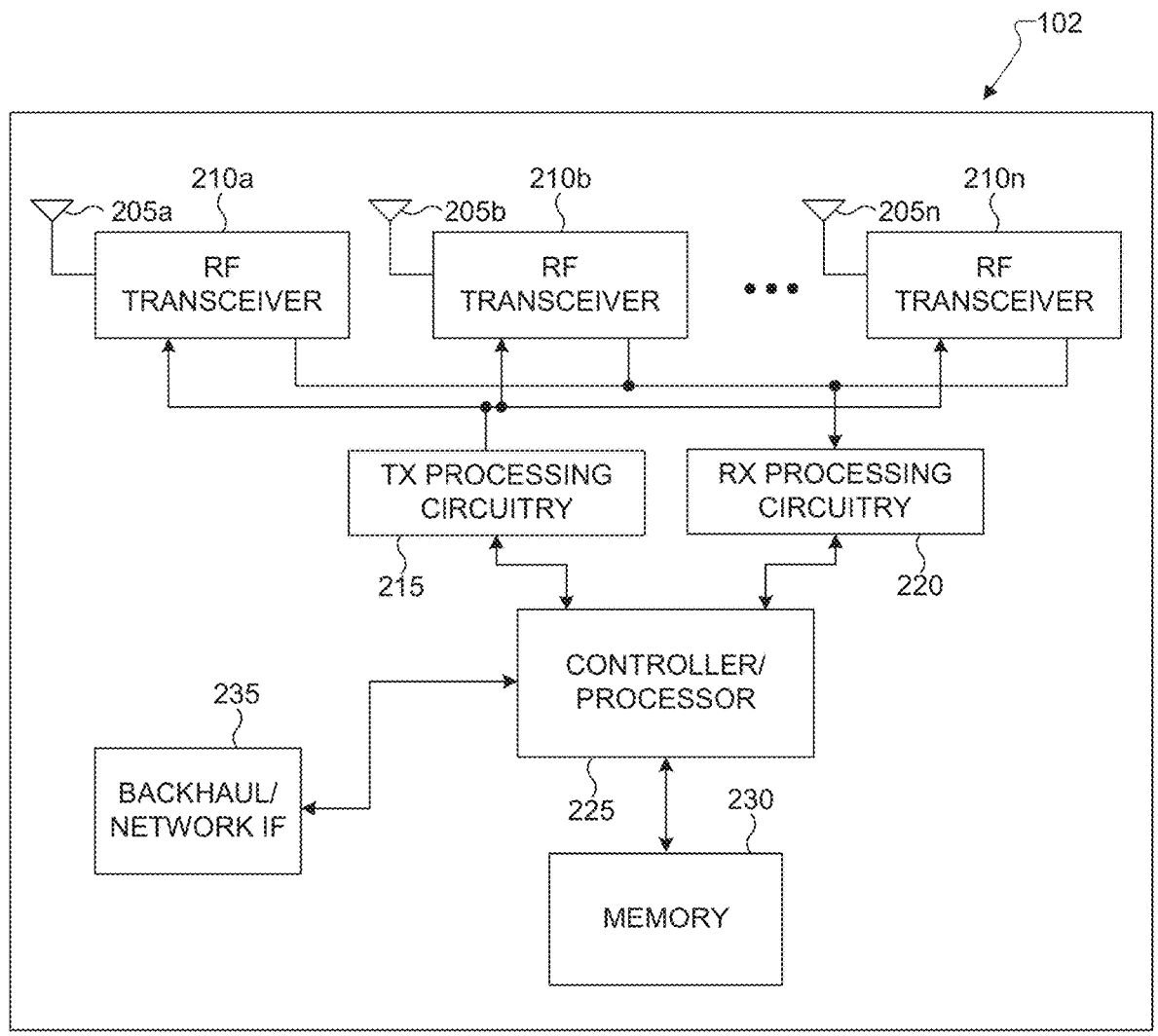
FIG. 2 illustrates an example gNB according to embodiments of the present disclosure.
Figure 3:
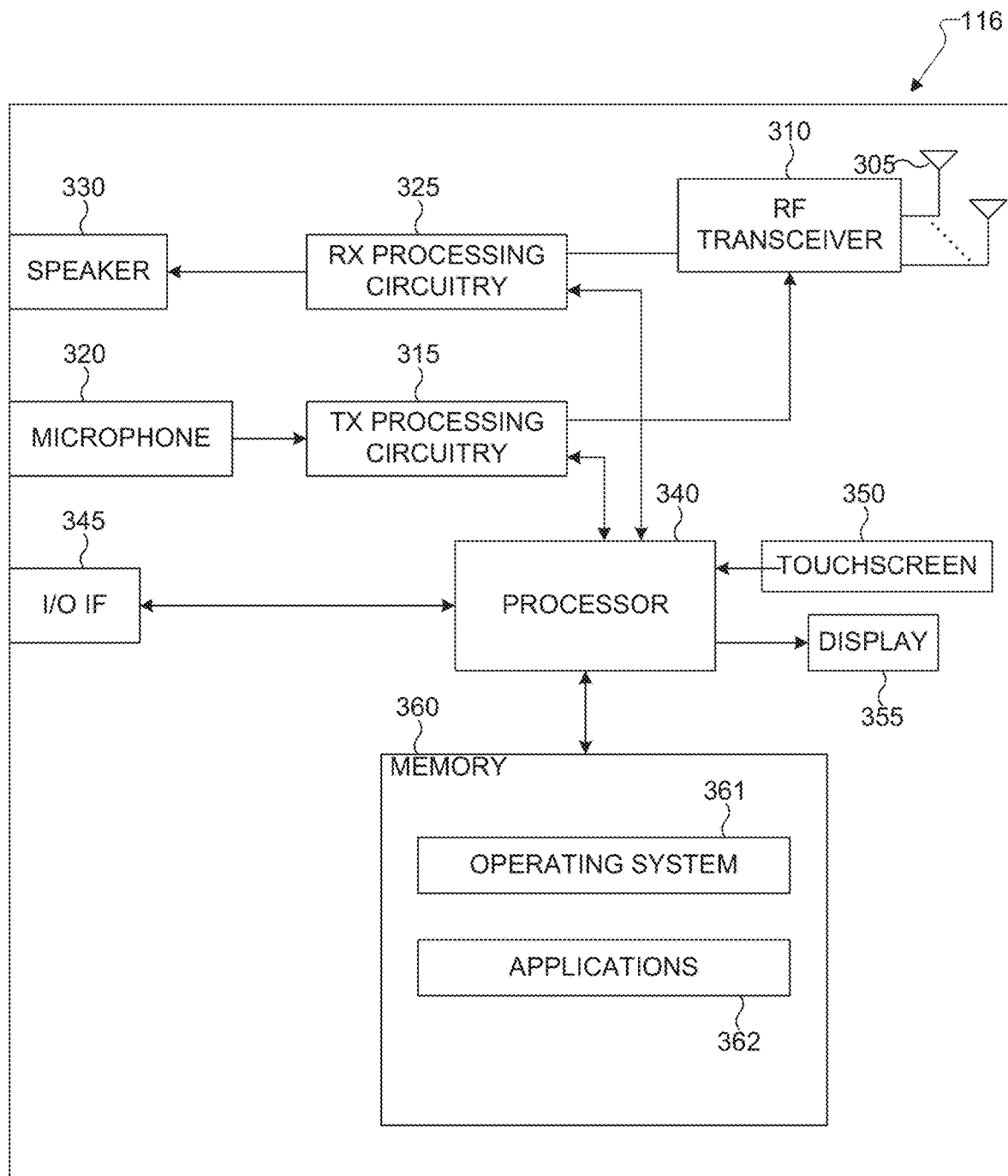
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for an UL transmission based on an UL codebook in an advanced wireless communication system. In certain embodiments, and one or more of the gNBs 101-103 includes circuitry, programing, or a combination thereof, to facilitate an UL transmission based on an UL codebook in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for UL transmission on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
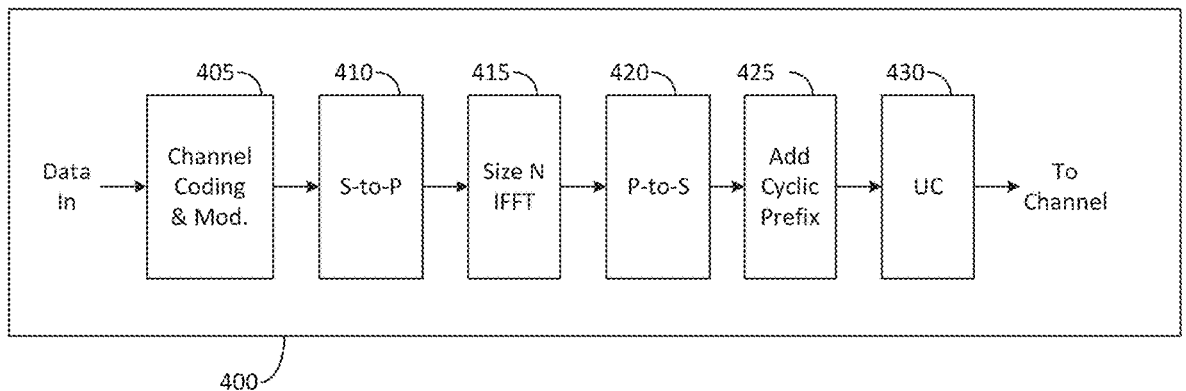
FIG. 4A illustrates a high-level diagram of an orthogonal frequency division multiple access transmit path according to embodiments of the present disclosure.
Figure 4B:
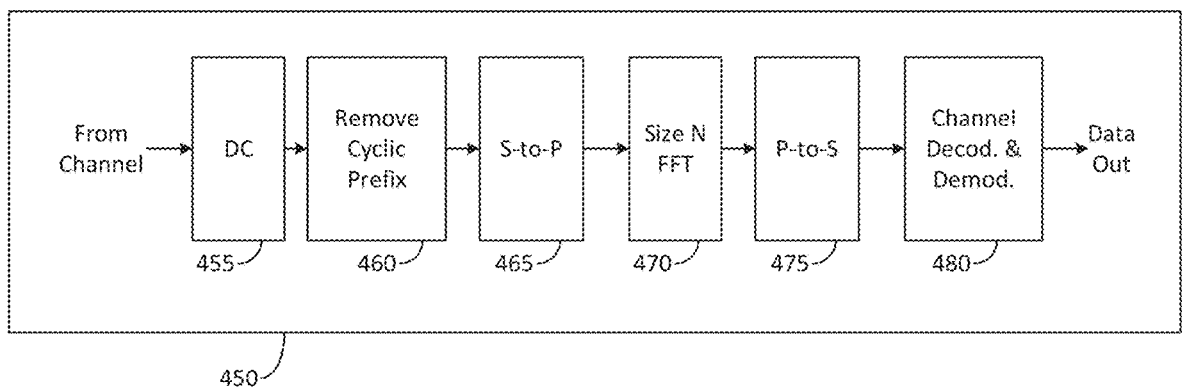
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (B Ss) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
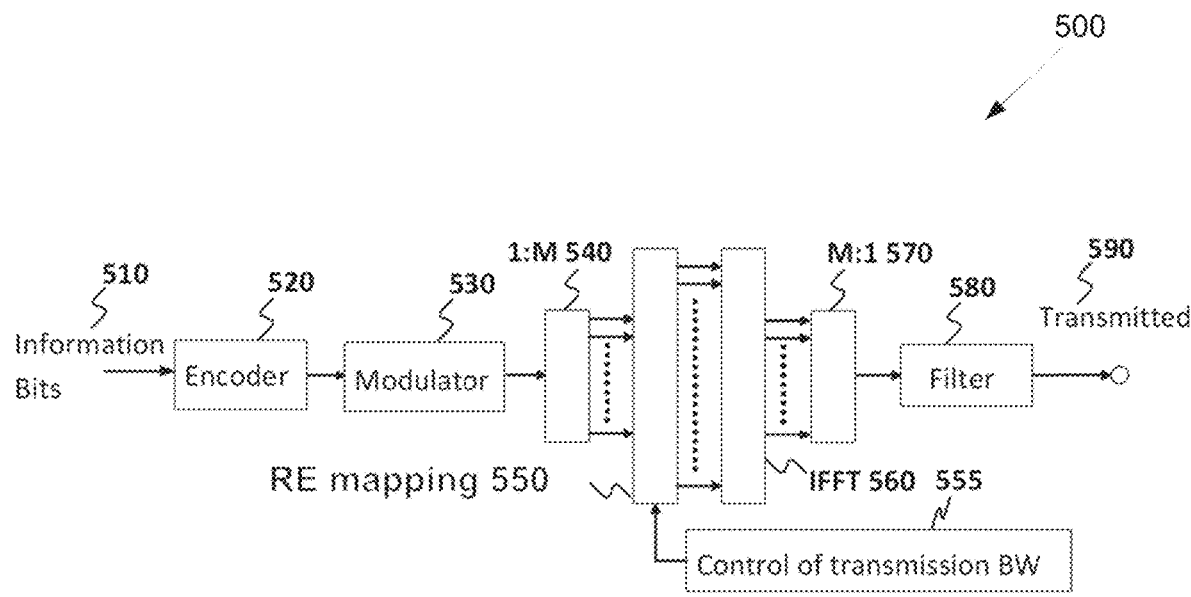
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
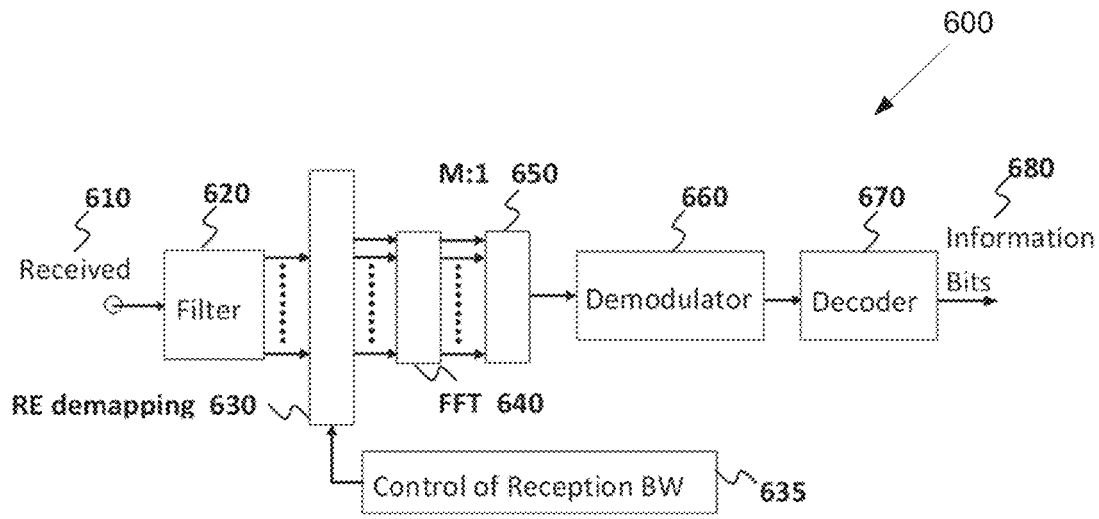
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
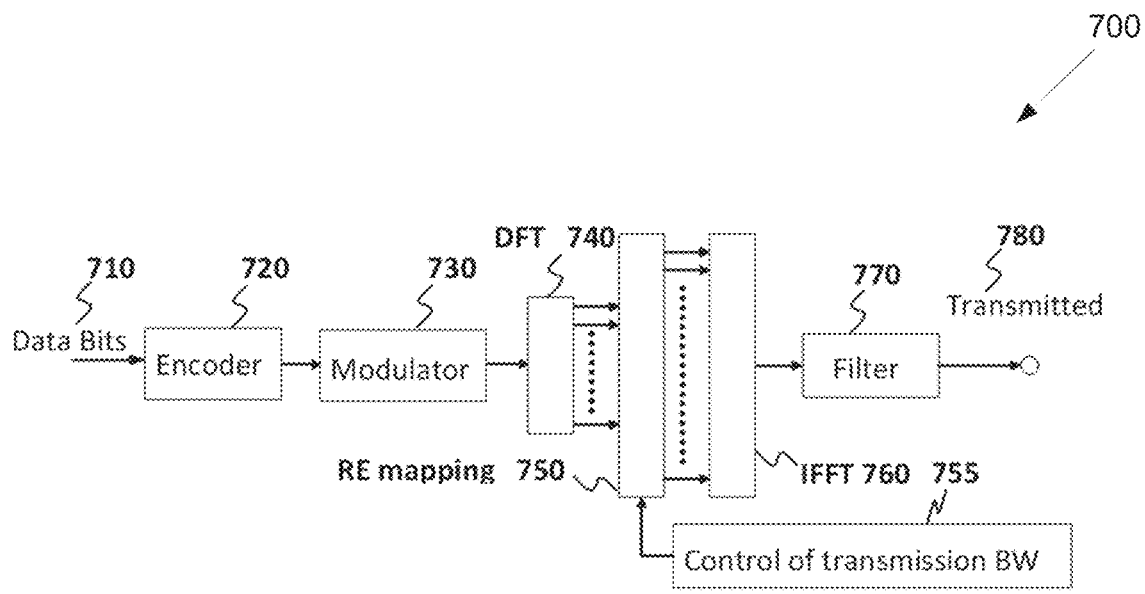
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
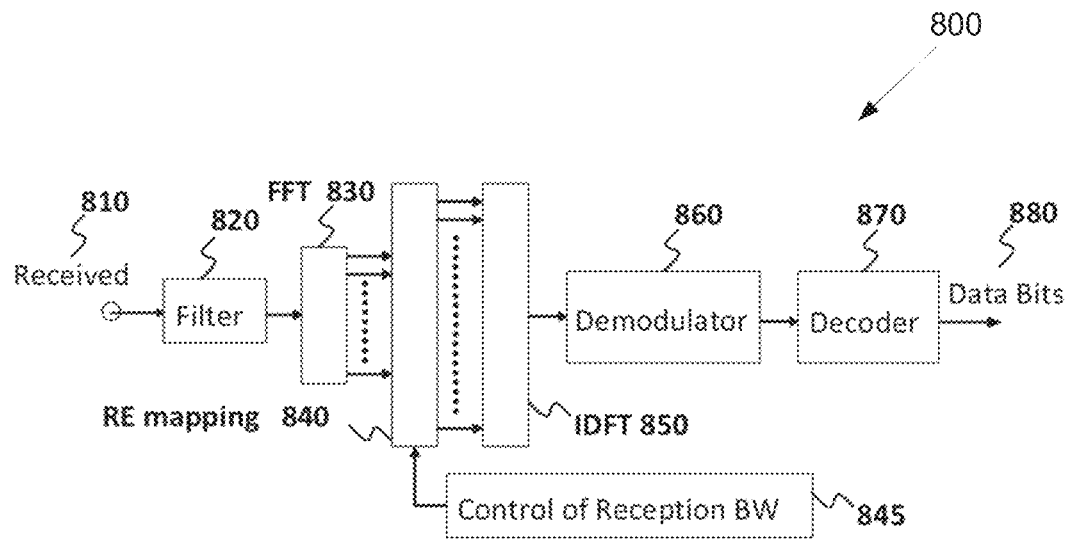
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km$^2$ with less stringent the reliability, data rate, and latency requirements.

In order for the 5G network to support such diverse services with different quality of services (QoS), one method has been identified in 3GPP specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
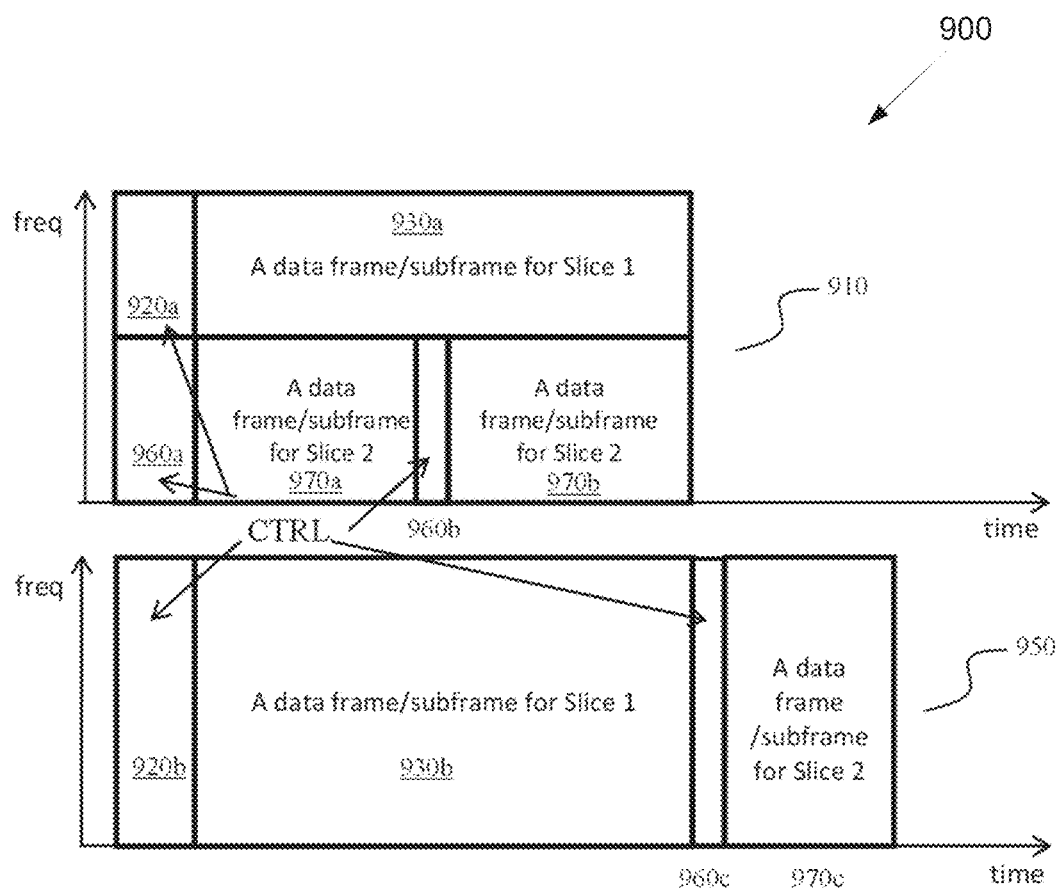
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

The 3GPP specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
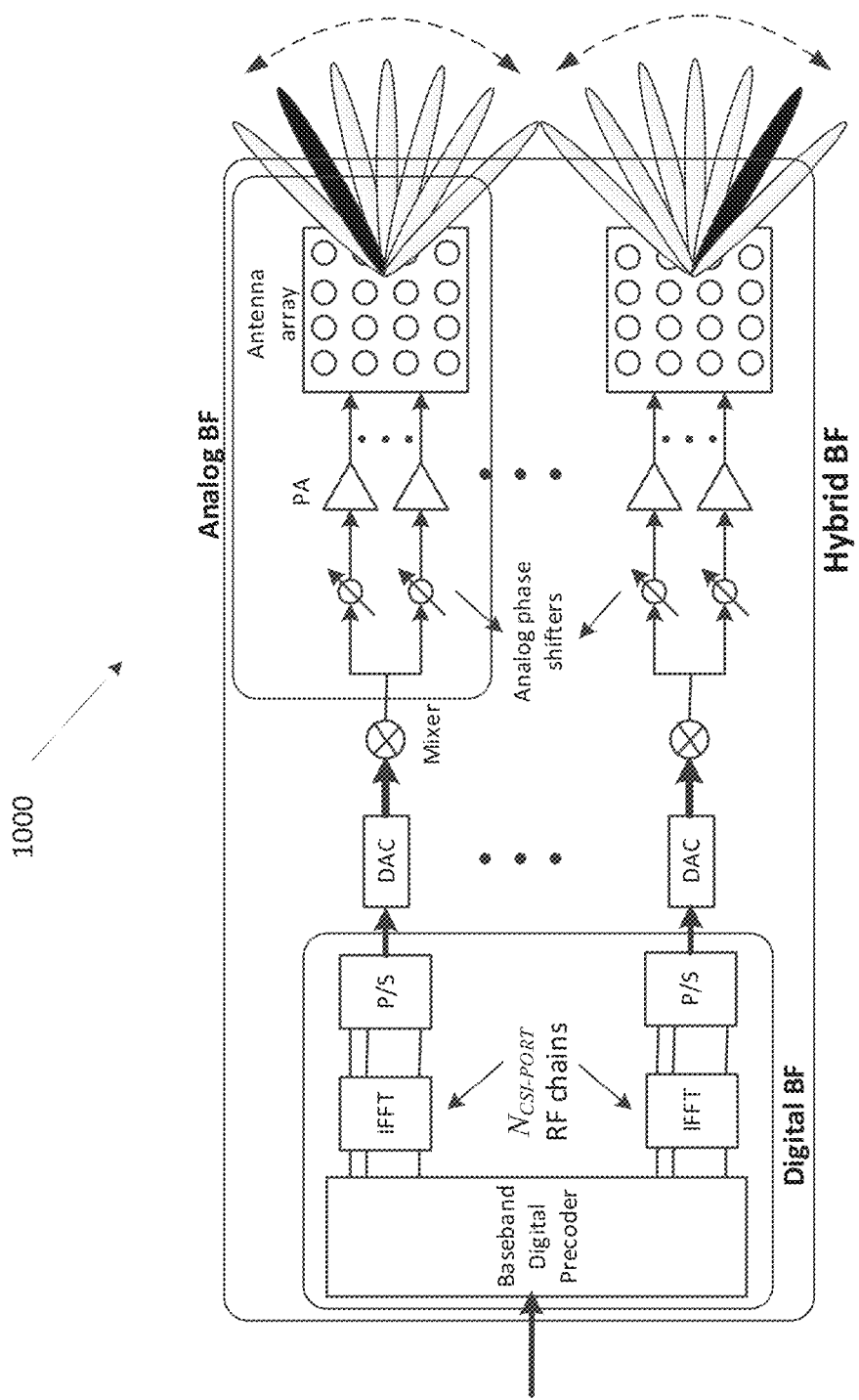
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI\text{-}PORT}$. A digital beamforming unit performs a linear combination across $N_{CSI\text{-}PORT}$ analog beams to further increase precoding gain. While analog beams are wideband (hence not frequency-selective), digital precoding can be varied across frequency sub-bands or resource blocks.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

Figure 11:
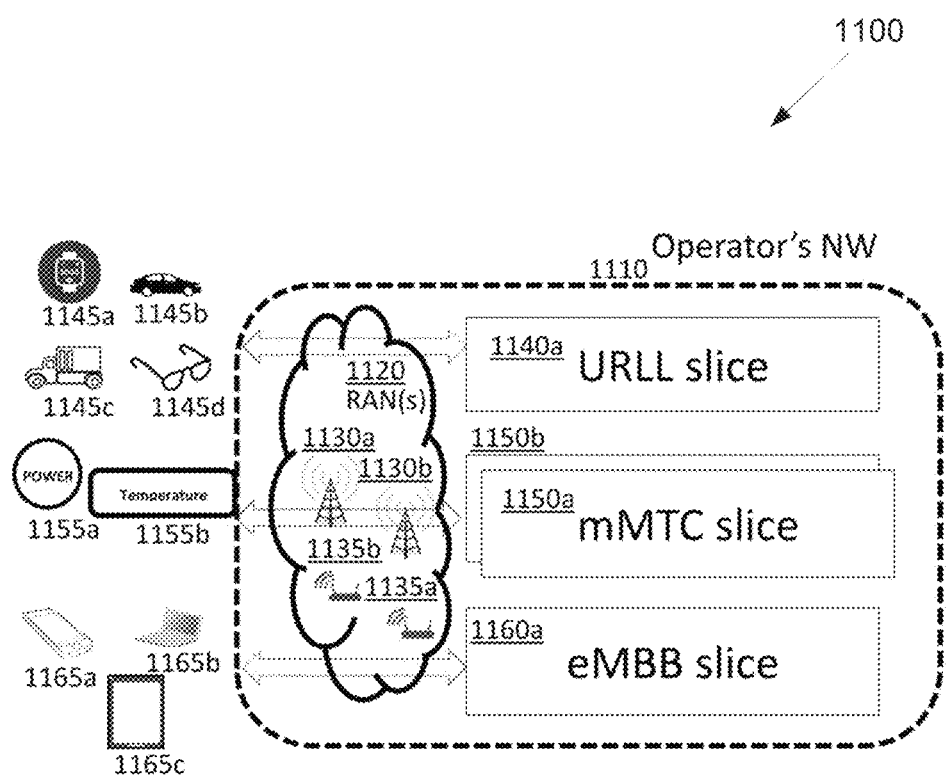
FIG. 11 illustrates an example network configuration according to embodiments of the present disclosure.

FIG. 11 illustrates an example network configuration 1100 according to embodiments of the present disclosure. The embodiment of the network configuration 1100 illustrated in FIG. 11 is for illustration only. FIG. 11 does not limit the scope of this disclosure to any particular implementation of the configuration 1100.

In order for the 5G network to support such diverse services with different quality of services (QoS), one scheme has been identified in 3GPP specification, called network slicing.

As shown in FIG. 11, An operator's network 1110 includes a number of radio access network(s) 1120 (RAN(s)) that are associated with network devices such as gNBs 1130a and 1130b, small cell base stations (femto/pico gNBs or Wi-Fi access points) 1135a and 1135b. The network 1110 can support various services, each represented as a slice.

In the example, an URLL slice 1140a serves UEs requiring URLL services such as cars 1145b, trucks 1145c, smart watches 1145a, and smart glasses 1145d. Two mMTC slices 1150a and 550b serve UEs requiring mMTC services such as power meters 555b, and temperature control box 1155b. One eMBB slice 1160a serves UEs requiring eMBB services such as cells phones 1165a, laptops 1165b, and tablets 1165c. A device configured with two slices can also be envisioned.

To enable digital precoding, efficient design of CSI-RS is a crucial factor. For this reason, three types of CSI reporting mechanism corresponding to three types of CSI-RS measurement behavior are supported, for example, "CLASS A" CSI reporting which corresponds to non-precoded CSI-RS, "CLASS B" reporting with K=1 CSI-RS resource which corresponds to UE-specific beamformed CSI-RS, and "CLASS B" reporting with K>1 CSI-RS resources which corresponds to cell-specific beamformed CSI-RS.

For non-precoded (NP) CSI-RS, a cell-specific one-to-one mapping between CSI-RS port and TXRU is utilized. Different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (e.g., comprising multiple ports). At least at a given time/frequency, CSI-RS ports have narrow beam widths and hence not cell wide coverage, and at least from the gNB perspective. At least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of representation thereof). To facilitate such a procedure, a first BF CSI-RS transmitted with periodicity T1 (ms) and a second NP CSI-RS transmitted with periodicity T2 (ms), where T1 T2. This approach is termed hybrid CSI-RS. The implementation of hybrid CSI-RS is largely dependent on the definition of CSI process and NZP CSI-RS resource.

In 3GPP LTE specification, UL SU-MIMO transmission is supported using a codebook-based transmission scheme. That is, an UL grant (containing DCI format 4) includes a single PMI field (along with RI) which indicates the single precoding vector or matrix (from a predefined codebook) a UE shall use for the scheduled UL transmission. Therefore, when multiple PRBs are allocated to the UE, a single precoding matrix indicated by the PMI implies that wideband UL precoding is utilized.

Despite its simplicity, this is clearly sub-optimal since a typical UL channel is frequency-selective and a UE is frequency scheduled to transmit using multiple PRBs. Yet another drawback of LTE UL SU-MIMO is its lack of support for scenarios where accurate UL-CSI is unavailable at the eNB (which is essential for properly operating codebook-based transmission). This situation can happen in scenarios with high-mobility UEs or bursty inter-cell interference in cells with poor isolation.

Therefore, there is a need for designing new components to enable more efficient support for UL MIMO for the following reasons. First, the support for frequency-selective (or subband) precoding for UL MIMO is desired whenever possible. Second, UL MIMO should offer competitive performance even when accurate UL-CSI is unavailable at the eNB. Third, the proposed UL MIMO solution should be able to exploit UL-DL reciprocity where CSI-RS is utilized by the UE to provide UL-CSI estimation for TDD scenarios. Additional examples of such efficient UL MIMO operations and components are described in U.S. patent application Ser. No. 15/491,927, filed Apr. 19, 2017 and entitled "Method and Apparatus for Enabling Uplink MIMO," which is incorporated by reference herein in its entirety.

In 3GPP LTE UL codebook, pre-coders with antenna selection has been supported in order to keep peak-to-average power ratio (PAPR) low and cubic-metric (CM) for rank>1 small. Antenna selection offers performance improvement in some scenarios, especially for SC-FDMA based UL in LTE. However, for 5G NR systems, it has been agreed in 3GPP RAN1 that UL is primarily going to be CP-OFDM based, although SC-FDMA based will also be supported. It is unclear that antenna selection will show any performance gain in case of CP-OFDM based UL. Whether antenna selection is considered or not, there are several alternatives for UL codebook in 5G NR. In addition, the UL codebook design is also dependent on whether or not the UE is capable to transmit UL data (PUSCH) using all of, or a subset of antenna ports. For example, the UE can be capable of at least one of full-coherent (all antenna ports), partial-coherent (a subset of antenna ports), or non-coherent UL transmission (a single antenna port) to transmit a layer in UL. The 5G NR UL codebook has been designed keeping this UE coherence capability in mind. However, if there are some issues (as explained later) with UL power control if UL power control similar to LTE is applied. This disclosure address a few example embodiments for the UL power control to overcome these issues.

In 3GPP NR specification, the UL transmission is configured to be either codebook-based or non-codebook-based via higher layer parameter txConfig in PUSCH-Config set to either "codebook" or "nonCodebook."

According to the 3GPP NR specification, the following is supported for codebook based UL transmission. For codebook based transmission, the UE determines the UE's codebook subsets based on TPMI and upon the reception of higher layer parameter ULCodebookSubset or codebook-Subset in PUSCH-Config which may be configured with "fullAndPartialAndNonCoherent," or "partialAndNonCoherent," or "nonCoherent" depending on the UE capability. The maximum transmission rank may be configured by the higher parameter ULmaxRank or maxRank in PUSCH-Config.

A UE reporting the UE's UE capability of "partialAndNonCoherent" transmission may not expect to be configured by ULCodebookSubset with "fullAndPartialAndNonCoherent."

A UE reporting the UE's UE capability of "Non-Coherent" transmission may not expect to be configured by ULCodebookSubset with "fullAndPartialAndNonCoherent" or with "partialAndNonCoherent."

A UE may not expect to be configured with the higher layer parameter ULCodebookSubset set to "partialAndNonCoherent" when two antenna ports are configured.

In the present disclosure, "fullAndPartialAndNonCoherent," "partialAndNonCoherent," and "Non-Coherent" are referred to as the three examples of coherence type/capability, where the term "coherence" implies a subset of antenna ports at the UE that can be used to transmit a layer of UL data coherently.

According to the 3GPP NR specification, for non-codebook-based UL transmission, the precoding matrix W equals the identity matrix. For codebook-based UL transmission, the precoding matrix W is given by W=1 for single-layer transmission on a single antenna port, otherwise by TABLE 1 to TABLE 6.

The subset of TPMI indices for the three coherence types are summarized in TABLE 7 and TABLE 8 where rank=r corresponds to (and is equivalent to) r layers.

The rank (or number of layers) and the corresponding precoding matrix W are indicated to the UE using TRI and TPMI, respectively. In one example, this indication is joint via a field "Precoding information and number of layers" in DCI, e.g., using DCI format 0_1. In another example, this indication is via higher layer RRC signaling. In one example, the mapping between a field "Precoding information and number of layers" and TRI/TPMI is according to NR.

TABLE 1

Precoding matrix W for single-layer transmission using two antenna ports

| TPMI index | W (ordered from left to right in increasing order of TPMI index) |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

TABLE 2

Precoding matrix W for single-layer transmission using four antenna ports with transform precoding disabled.

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

TABLE 3

Precoding matrix W for two-layer transmission using two antenna ports with transform precoding disabled.

| TPMI index | W (ordered from left to right in increasing order of TPMI index) |
|---|---|
| 0-2 | $\frac{1}{\sqrt{2}}\begin{bmatrix}1&0\\0&1\end{bmatrix}$ $\frac{1}{2}\begin{bmatrix}1&1\\1&-1\end{bmatrix}$ $\frac{1}{2}\begin{bmatrix}1&1\\j&-j\end{bmatrix}$ |

TABLE 4

Precoding matrix W for two-layer transmission using four antenna ports with transform precoding disabled.

| TPMI index | W (ordered from left to right in increasing order of TPMI index) |
|---|---|
| 0-3 | $\frac{1}{2}\begin{bmatrix}1&0\\0&1\\0&0\\0&0\end{bmatrix}$ $\frac{1}{2}\begin{bmatrix}1&0\\0&0\\0&1\\0&0\end{bmatrix}$ $\frac{1}{2}\begin{bmatrix}1&0\\0&0\\0&0\\0&1\end{bmatrix}$ $\frac{1}{2}\begin{bmatrix}0&0\\1&0\\0&1\\0&0\end{bmatrix}$ |

TABLE 4-continued

Precoding matrix W for two-layer transmission using four antenna ports with transform precoding disabled.

| TPMI index | W (ordered from left to right in increasing order of TPMI index) |
|---|---|
| 4-7 | $\frac{1}{2}\begin{bmatrix}0 & 0\\1 & 0\\0 & 0\\0 & 1\end{bmatrix}$ $\frac{1}{2}\begin{bmatrix}0 & 0\\0 & 0\\1 & 0\\0 & 1\end{bmatrix}$ $\frac{1}{2}\begin{bmatrix}1 & 0\\0 & 1\\1 & 0\\0 & -j\end{bmatrix}$ $\frac{1}{2}\begin{bmatrix}1 & 0\\0 & 1\\1 & 0\\0 & j\end{bmatrix}$ |
| 8-11 | $\frac{1}{2}\begin{bmatrix}1 & 0\\0 & 1\\-j & 0\\0 & 1\end{bmatrix}$ $\frac{1}{2}\begin{bmatrix}1 & 0\\0 & 1\\-j & 0\\0 & -1\end{bmatrix}$ $\frac{1}{2}\begin{bmatrix}1 & 0\\0 & 1\\-1 & 0\\0 & -j\end{bmatrix}$ $\frac{1}{2}\begin{bmatrix}1 & 0\\0 & 1\\-1 & 0\\0 & j\end{bmatrix}$ |
| 12-15 | $\frac{1}{2}\begin{bmatrix}1 & 0\\0 & 1\\j & 0\\0 & 1\end{bmatrix}$ $\frac{1}{2}\begin{bmatrix}1 & 0\\0 & 1\\j & 0\\0 & -1\end{bmatrix}$ $\frac{1}{2\sqrt{2}}\begin{bmatrix}1 & 1\\1 & 1\\1 & -1\\1 & -1\end{bmatrix}$ $\frac{1}{2\sqrt{2}}\begin{bmatrix}1 & 1\\1 & 1\\j & -j\\j & -j\end{bmatrix}$ |
| 16-19 | $\frac{1}{2\sqrt{2}}\begin{bmatrix}1 & 1\\j & j\\1 & -1\\j & -j\end{bmatrix}$ $\frac{1}{2\sqrt{2}}\begin{bmatrix}1 & 1\\j & j\\j & -j\\-1 & 1\end{bmatrix}$ $\frac{1}{2\sqrt{2}}\begin{bmatrix}1 & 1\\-1 & -1\\1 & -1\\-1 & 1\end{bmatrix}$ $\frac{1}{2\sqrt{2}}\begin{bmatrix}1 & 1\\-1 & -1\\j & -j\\-j & j\end{bmatrix}$ |
| 20-21 | $\frac{1}{2\sqrt{2}}\begin{bmatrix}1 & 1\\-j & -j\\1 & -1\\-j & j\end{bmatrix}$ $\frac{1}{2\sqrt{2}}\begin{bmatrix}1 & 1\\-j & -j\\j & -j\\1 & -1\end{bmatrix}$ — — |

TABLE 5

Precoding matrix W for three-layer transmission using four antenna ports with transform precoding disabled.

| TPMI index | W (ordered from left to right in increasing order of TPMI index) |
|---|---|
| 0-3 | $\frac{1}{2}\begin{bmatrix}1 & 0 & 0\\0 & 1 & 0\\0 & 0 & 1\\0 & 0 & 0\end{bmatrix}$ $\frac{1}{2}\begin{bmatrix}1 & 0 & 0\\0 & 1 & 0\\1 & 0 & 0\\0 & 0 & 1\end{bmatrix}$ $\frac{1}{2}\begin{bmatrix}1 & 0 & 0\\0 & 1 & 0\\-1 & 0 & 0\\0 & 0 & 1\end{bmatrix}$ $\frac{1}{2}\begin{bmatrix}1 & 1 & 1\\1 & -1 & 1\\1 & 1 & -1\\1 & -1 & -1\end{bmatrix}$ |
| 4-6 | $\frac{1}{2\sqrt{3}}\begin{bmatrix}1 & 1 & 1\\1 & -1 & 1\\j & j & -j\\j & -j & -j\end{bmatrix}$ $\frac{1}{2\sqrt{3}}\begin{bmatrix}1 & 1 & 1\\-1 & 1 & -1\\1 & 1 & -1\\-1 & 1 & 1\end{bmatrix}$ $\frac{1}{2\sqrt{3}}\begin{bmatrix}1 & 1 & 1\\-1 & 1 & -1\\j & j & -j\\-j & j & j\end{bmatrix}$ — |

TABLE 6

Precoding matrix W for four-layer transmission using four antenna ports with transform precoding disabled.

| TPMI index | W (ordered from left to right in increasing order of TPMI index) |
|---|---|
| 0-3 | $\frac{1}{2}\begin{bmatrix}1 & 0 & 0 & 0\\0 & 1 & 0 & 0\\0 & 0 & 1 & 0\\0 & 0 & 0 & 1\end{bmatrix}$ $\frac{1}{2\sqrt{2}}\begin{bmatrix}1 & 1 & 0 & 0\\0 & 0 & 1 & 1\\1 & 1 & 0 & 0\\0 & 0 & 1 & -1\end{bmatrix}$ $\frac{1}{2\sqrt{2}}\begin{bmatrix}1 & 1 & 0 & 0\\0 & 0 & 1 & 1\\j & -j & 0 & 0\\0 & 0 & j & -j\end{bmatrix}$ $\frac{1}{4}\begin{bmatrix}1 & 1 & 1 & 1\\1 & -1 & 1 & -1\\1 & 1 & -1 & -1\\1 & -1 & -1 & 1\end{bmatrix}$ |

TABLE 6-continued

Precoding matrix W for four-layer transmission using four antenna ports with transform precoding disabled.

| TPMI index | W (ordered from left to right in increasing order of TPMI index) | | |
|---|---|---|---|
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | — | — | — |

TABLE 7

TPMI indices for 2 antenna ports

| Rank | Non-Coherent | fullAndPartialAndNonCoherent |
|---|---|---|
| 1 | 0-1 | 0-5 |
| 2 | 0 | 0-2 |

TABLE 8

TPMI indices for 4 antenna ports

| Rank | Non-Coherent | partialAndNonCoherent | fullAndPartialAndNonCoherent |
|---|---|---|---|
| 1 | 0-3 | 0-11 | 0-27 |
| 2 | 0-5 | 0-13 | 0-21 |
| 3 | 0 | 0-2 | 0-6 |
| 4 | 0 | 0-2 | 0-4 |

TABLE 9

Total power of precoding matrix W for 2 antenna ports

| | Non-Coherent TPMIs | | Full-Coherent TPMIs | |
|---|---|---|---|---|
| Rank | TPMI indices | Total power | TPMI indices | Total power |
| 1 | 0-1 | ½ | 2-5 | 1 |
| 2 | 0 | 1 | 1-2 | 1 |

TABLE 10

Total power of precoding matrix W for 4 antenna ports

| | Non-Coherent TPMIs | | Partial-Coherent TPMIs | | Full-Coherent TPMIs | |
|---|---|---|---|---|---|---|
| Rank | TPMI indices | Total power | TPMI indices | Total power | TPMI indices | Total power |
| 1 | 0-3 | ¼ | 4-11 | ½ | 12-27 | 1 |
| 2 | 0-5 | ½ | 6-13 | 1 | 14-21 | 1 |
| 3 | 0 | ¾ | 1-2 | 1 | 3-6 | 1 |
| 4 | 0 | 1 | 1-2 | 1 | 3-4 | 1 |

The total power of the pre-coding matrix W for different rank and coherence types is summarized in TABLE 9 and TABLE 10. The following power-related issues can be observed.

In one issue, for non-coherent and partial-coherent TPMIs, total power increases as rank increases, which implies that the TPMI selection will be biased to higher rank. In particular, even for cell-edge UEs, rank 1 TPMI may not be selected, which can severely affect cell-edge performance.

In another issue, for a given rank, total power of non-coherent TPMIs≤total power of partial-coherent TPMIs≤total power of full-coherent TPMIs. The reason for this trend is that the power of non-zero antenna ports does not change across three types of TPMIs. This may be beneficial in some scenarios, for example, UE implementation for power saving. However, this may not be desired always.

The aforementioned issues can be handled by TPMI or TPMI group signaling from the UE (as part of UE capability signaling), where the signaling indicates TPMIs or TPMI groups for which the UE can achieve full power in UL transmission.

The aforementioned issues can also be handled by virtualizing (combining) multiple transmit (Tx) chains (or antenna ports), e.g., a UE can virtualize Tx chains when configured with an SRS resource that has fewer ports than the number of Tx chains.

In one embodiment 1, a UE reports, via UE capability signaling, whether it is capable of full power UL transmission for codebook-based UL transmission. The UE may or may not report additional details about the UE capability signaling. When the UE reports additional details about the UE capability signaling, then the additional detail includes a B-bit signaling, where the B-bit signaling $S=b_0 \ldots b_{B-1}$ indicates (reports) TPMIs or TPMI groups that can be used to transmit UL transmission at full power. In one example, each bit $b_i$ is associated with a TPMI or TPMI group in the rank-1 UL codebook, i.e., the B-bit signaling is a bitmap of size (or length) equal to the total number of TPMIs or TPMI groups (let us denote this number by Z) with which the UE can support full power UL transmission. In another example, $B=\lceil \log_2 Z \rceil$ and the $S=b_0 \ldots b_{B-1}$ indicates (reports) the Z TPMIs or TPMI groups for full power UL transmission, where $\lceil x \rceil$ is a ceiling function which maps a number x to the nearest integer y that is larger (or greater than) x, i.e., y≥x.

In one example, a TPMI group is defined as a group (set) of TPMIs in the rank-1 UL codebook that correspond to precoding matrices having zero and non-zero entries at the same location. In this example, each bit $b_i$ is associated with a length-N vector comprising of '0's and '1's, where N is number of antenna ports at the UE, e.g., N∈{2,4}.

In another example, a TPMI group is defined as a group (set) of TPMIs in the rank-1 UL codebook that correspond to one or multiple consecutive TPMIs, i.e., TPMI(s)=α, α+1, ..., α+K−1 where α is the first TPMI in the TPMI group and K is the number of consecutive TPMIs comprising the TPMI group. At least one of the following example can be used.

In one example Ex 1-1: α=0 is fixed and K=N−1 is fixed, where N is the number of antenna ports at the UE.

In one example Ex 1-2: α=0 is fixed and K=N is fixed, where N is the number of antenna ports at the UE.

In one example Ex 1-3: same as Ex 1-1 except that when N=4.

In one example Ex 1-4: same as Ex 1-2 except that when N=4.

In one example Ex 1-5: same as Ex 1-1 except that when N=4 and non-coherent (NC) UE.

In one example Ex 1-6: same as Ex 1-2 except that when N=4 and NC UE.

In one example Ex 1-7: α=0 and K is higher layer configured.

In one example Ex 1-8: both a and K are higher layer configured.

In another example, a TPMI group is defined as a group (set) of TPMIs in the rank-1 UL codebook that correspond to one or multiple TPMIs, where the number of such group of TPMIs (Z) is fixed. In one example, Z is fixed (e.g., to 2) regardless of number of antenna ports (N) at the UE. In another example, Z is fixed depending on the value of N, e.g., Z=N or Z=2 for N=2 and Z=4 or 6 for N=4.

At least one of the following alternatives is used for this B-bit indication.

In one alternative Alt 1-1, B=2 and B=4 for 2 and 4 antenna ports (2Tx and 4Tx) at the UE, and the B-bit signaling indicates TPMIs or TPMI groups comprising vectors from a group (G) as shown in Table 11.

TABLE 11

| UE capability reporting | | |
|---|---|---|
| Number of antenna ports | Group (G) | B (# bits) |
| 2Tx | $\begin{bmatrix}1\\0\end{bmatrix}\begin{bmatrix}0\\1\end{bmatrix}$ | 2 |

TABLE 11-continued

| UE capability reporting | | |
|---|---|---|
| Number of antenna ports | Group (G) | B (# bits) |
| 4Tx | $\begin{bmatrix}1\\0\\0\\0\end{bmatrix}\begin{bmatrix}0\\1\\0\\0\end{bmatrix}\begin{bmatrix}0\\0\\1\\0\end{bmatrix}\begin{bmatrix}0\\0\\0\\1\end{bmatrix}$ | 4 |

In one alternative Alt 1-2, B=2 and B=6 for 2 and 4 antenna ports at the UE, and the B-bit signaling indicates TPMIs or TPMI groups comprising vectors from a group (G) as shown in Table 12.

TABLE 12

| UE capability reporting | | |
|---|---|---|
| Number of antenna ports | Group (G) | B (# bits) |
| 2Tx | $\begin{bmatrix}1\\0\end{bmatrix}\begin{bmatrix}0\\1\end{bmatrix}$ | 2 |
| 4Tx | $\begin{bmatrix}1\\0\\0\\0\end{bmatrix}\begin{bmatrix}0\\1\\0\\0\end{bmatrix}\begin{bmatrix}0\\0\\1\\0\end{bmatrix}\begin{bmatrix}0\\0\\0\\1\end{bmatrix}$ $\frac{1}{\sqrt{2}}\begin{bmatrix}0\\1\\0\\1\end{bmatrix}\frac{1}{\sqrt{2}}\begin{bmatrix}1\\0\\1\\0\end{bmatrix}$ | 6 |

In one alternative Alt 1-3, B=2 and B=4 for 2 and 4 antenna ports at the UE, and the B-bit signaling indicates TPMIs or TPMI groups comprising vectors from a group (G) as shown in Table 13. In this alternative, the additional capability signaling is reported by only when the UE is non-coherent (NC) or partial coherent (PC).

TABLE 13

| UE capability reporting | | | |
|---|---|---|---|
| Number of antenna ports | codebookSubset | Group (G) | B (# bits) |
| 2Tx | nonCoherent | $\begin{bmatrix}1\\0\end{bmatrix}\begin{bmatrix}0\\1\end{bmatrix}$ | 2 |
| 4Tx | nonCoherent or partialAndNonCoherent | $\begin{bmatrix}1\\0\\0\\0\end{bmatrix}\begin{bmatrix}0\\1\\0\\0\end{bmatrix}\begin{bmatrix}0\\0\\1\\0\end{bmatrix}\begin{bmatrix}0\\0\\0\\1\end{bmatrix}$ | 4 |

In one alternative Alt 1-4, B=2 and B=6 for 2 and 4 antenna ports at the UE, and the B-bit signaling indicates TPMIs or TPMI groups comprising vectors from a group (G) as shown in Table 14. In this alternative, the additional capability signaling is reported by only when the UE is non-coherent (NC) or partial coherent (PC).

TABLE 14

| | UE capability reporting | | |
|---|---|---|---|
| Number of antenna ports | codebookSubset | Group (G) | B (# bits) |
| 2Tx | nonCoherent | $\begin{bmatrix}1\\0\end{bmatrix} \begin{bmatrix}0\\1\end{bmatrix}$ | 2 |
| 4Tx | nonCoherent or partialAndNonCoherent | $\begin{bmatrix}1\\0\\0\\0\end{bmatrix} \begin{bmatrix}0\\1\\0\\0\end{bmatrix} \begin{bmatrix}0\\0\\1\\0\end{bmatrix} \begin{bmatrix}0\\0\\0\\1\end{bmatrix}$ $\frac{1}{\sqrt{2}}\begin{bmatrix}0\\1\\0\\1\end{bmatrix} \frac{1}{\sqrt{2}}\begin{bmatrix}1\\0\\1\\0\end{bmatrix}$ | 6 |

In one alternative Alt 1-5, B=2 for 2 antenna ports at the UE, B=4 for 4 antenna ports at the NC UE, and B=6 for 4 antenna ports at the PC UE. The B-bit signaling indicates TPMIs or TPMI groups comprising vectors from a group (G) as shown in Table 15. In this alternative, the additional capability signaling is reported by only when the UE is non-coherent (NC) or partial coherent (PC).

TABLE 15

| | UE capability reporting | | |
|---|---|---|---|
| Number of antenna ports | codebookSubset | Group (G) | B (# bits) |
| 2Tx | nonCoherent | $\begin{bmatrix}1\\0\end{bmatrix} \begin{bmatrix}0\\1\end{bmatrix}$ | 2 |
| 4Tx | nonCoherent | $\begin{bmatrix}1\\0\\0\\0\end{bmatrix} \begin{bmatrix}0\\1\\0\\0\end{bmatrix} \begin{bmatrix}0\\0\\1\\0\end{bmatrix} \begin{bmatrix}0\\0\\0\\1\end{bmatrix}$ | 4 |
| 4Tx | partialAndNonCoherent | $\begin{bmatrix}1\\0\\0\\0\end{bmatrix} \begin{bmatrix}0\\1\\0\\0\end{bmatrix} \begin{bmatrix}0\\0\\1\\0\end{bmatrix} \begin{bmatrix}0\\0\\0\\1\end{bmatrix}$ $\frac{1}{\sqrt{2}}\begin{bmatrix}0\\1\\0\\1\end{bmatrix} \frac{1}{\sqrt{2}}\begin{bmatrix}1\\0\\1\\0\end{bmatrix}$ | 6 |

In one alternative Alt 1-6, Z=2, B=1 for 2 antenna ports at the UE, and the vectors comprising TPMIs or TPMI groups are as shown in Table 16, where a few example sub-alternatives are shown.

TABLE 16

UE capability reporting

| S = $b_0$ | TPMI/TPMI group: Alt 1-6-1 | TPMI/TPMI group: Alt 1-6-2 | TPMI/TPMI group: Alt 1-6-3 |
|---|---|---|---|
| 0 | {TPMI = 0}: $\begin{bmatrix} 1 \\ 0 \end{bmatrix}$ | {TPMI = 1}: $\begin{bmatrix} 0 \\ 1 \end{bmatrix}$ | {TPMI = 0}: $\begin{bmatrix} 1 \\ 0 \end{bmatrix}$ |
| 1 | {TPMI = 1}: $\begin{bmatrix} 0 \\ 1 \end{bmatrix}$ | {TPMI = 0}: $\begin{bmatrix} 1 \\ 0 \end{bmatrix}$ | {TPMI = 0, 1}: $\left\{ \begin{bmatrix} 1 \\ 0 \end{bmatrix}, \begin{bmatrix} 0 \\ 1 \end{bmatrix} \right\}$ |

In one alternative Alt 1-7, Z=2, B=1 for 4 antenna ports at the UE, and the vectors comprising TPMIs or TPMI groups are as shown in Table 17, where a few example sub-alternatives are shown.

TABLE 17

UE capability reporting

| S = $b_0$ | TPMI/TPMI group: Alt 1-7-1 | TPMI/TPMI group: Alt 1-7-2 | TPMI/TPMI group: Alt 1-7-3 |
|---|---|---|---|
| 0 | {TPMI = 0}: $\begin{bmatrix} 1 \\ 0 \\ 0 \\ 0 \end{bmatrix}$ | {TPMI = 1}: $\begin{bmatrix} 0 \\ 1 \\ 0 \\ 0 \end{bmatrix}$ | {TPMI = 0}: $\begin{bmatrix} 1 \\ 0 \\ 0 \\ 0 \end{bmatrix}$ |
| 1 | {TPMI = 1}: $\begin{bmatrix} 0 \\ 1 \\ 0 \\ 0 \end{bmatrix}$ | {TPMI = 0}: $\begin{bmatrix} 1 \\ 0 \\ 0 \\ 0 \end{bmatrix}$ | {TPMI = 0, 1}: $\left\{ \begin{bmatrix} 1 \\ 0 \\ 0 \\ 0 \end{bmatrix}, \begin{bmatrix} 0 \\ 1 \\ 0 \\ 0 \end{bmatrix} \right\}$ |

In one alternative Alt 1-8, Z=3, B=2 for 4 antenna ports at the UE, and the vectors comprising TPMIs or TPMI groups are as shown in Table 18, where a few example sub-alternatives are shown.

TABLE 18

UE capability reporting

| S = $b_0 b_1$ | TPMI/TPMI group: Alt 1-8-1 | TPMI/TPMI group: Alt 1-8-2 | TPMI/TPMI group: Alt 1-3-3 |
|---|---|---|---|
| 00 | {TPMI = 0}: $\begin{bmatrix} 1 \\ 0 \\ 0 \\ 0 \end{bmatrix}$ | {TPMI = 0}: $\begin{bmatrix} 1 \\ 0 \\ 0 \\ 0 \end{bmatrix}$ | {TPMI = 0}: $\begin{bmatrix} 1 \\ 0 \\ 0 \\ 0 \end{bmatrix}$ |
| 01 | {TPMI = 1}: $\begin{bmatrix} 0 \\ 1 \\ 0 \\ 0 \end{bmatrix}$ | {TPMI = 1}: $\begin{bmatrix} 0 \\ 1 \\ 0 \\ 0 \end{bmatrix}$ | {TPMI = 0, 1}: $\left\{ \begin{bmatrix} 1 \\ 0 \\ 0 \\ 0 \end{bmatrix}, \begin{bmatrix} 0 \\ 1 \\ 0 \\ 0 \end{bmatrix} \right\}$ |
| 10 | {TPMI = 2}: $\begin{bmatrix} 0 \\ 0 \\ 1 \\ 0 \end{bmatrix}$ | {TPMI = 0, 1}: $\left\{ \begin{bmatrix} 1 \\ 0 \\ 0 \\ 0 \end{bmatrix}, \begin{bmatrix} 0 \\ 1 \\ 0 \\ 0 \end{bmatrix} \right\}$ | {TPMI = 0, 1, 2}: $\left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix} \right\}$ |
| 11 | reserved | reserved | reserved |

In one alternative Alt 1-9, Z=4, B=2 for 4 antenna ports at the UE, and the vectors comprising TPMIs or TPMI groups are as shown in Table 19, where a few example sub-alternatives are shown.

Coherent in it UE capability). In another example, for a 2Tx UE, one of the above alternatives (e.g., Alt 1-1 through Alt 1-10) is used regardless of whether the UE is non-coherent or partial-coherent or full-coherent (i.e., when the UE

TABLE 19

UE capability reporting

| $S = b_0 b_1$ | TPMI/TPMI group: Alt 1-9-1 | TPMI/TPMI group: Alt 1-9-2 | TPMI/TPMI group: Alt 1-9-3 |
|---|---|---|---|
| 00 | $\{TPMI = 0\}: \begin{bmatrix} 1 \\ 0 \\ 0 \\ 0 \end{bmatrix}$ | $\{TPMI = 0\}: \begin{bmatrix} 1 \\ 0 \\ 0 \\ 0 \end{bmatrix}$ | $\{TPMI = 0\}: \begin{bmatrix} 1 \\ 0 \\ 0 \\ 0 \end{bmatrix}$ |
| 01 | $\{TPMI = 1\}: \begin{bmatrix} 0 \\ 1 \\ 0 \\ 0 \end{bmatrix}$ | $\{TPMI = 1\}: \begin{bmatrix} 0 \\ 1 \\ 0 \\ 0 \end{bmatrix}$ | $\{TPMI = 0, 1\}: \left\{\begin{bmatrix} 1 \\ 0 \\ 0 \\ 0 \end{bmatrix}, \begin{bmatrix} 0 \\ 1 \\ 0 \\ 0 \end{bmatrix}\right\}$ |
| 10 | $\{TPMI = 2\}: \begin{bmatrix} 0 \\ 0 \\ 1 \\ 0 \end{bmatrix}$ | $\{TPMI = 0, 1\}: \left\{\begin{bmatrix} 1 \\ 0 \\ 0 \\ 0 \end{bmatrix}, \begin{bmatrix} 0 \\ 1 \\ 0 \\ 0 \end{bmatrix}\right\}$ | $\{TPMI = 0, 1, 2\}: \left\{\begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}\right\}$ |
| 11 | $\{TPMI = 3\}: \begin{bmatrix} 0 \\ 0 \\ 0 \\ 1 \end{bmatrix}$ | $\{TPMI = 0, 1, 2\}: \left\{\begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}\right\}$ | $\{TPMI = 0, 1, 2, 3\}: \left\{\begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix}\right\}$ |

In one alternative Alt 1-10, B=3 for 4 antenna ports at the UE, and the vectors comprising TPMIs or TPMI groups are as shown in Table 20, where a few example sub-alternatives are shown.

reports nonCoherent or partialCoherent or fullCoherent or partialAndNonCoherent or fullAndPartialAndNonCoherent in it UE capability).

TABLE 20

UE capability reporting

| $S = b_0 b_1 b_2$ | Alt 1-10-1 | Alt 1-10-2 | Alt 1-10-3 | Alt 1-10-4 |
|---|---|---|---|---|
| 000 | {TPMI = 0} | {TPMI = 0} | {TPMI = 0} | {TPMI = 0} |
| 001 | {TPMI = 1} | {TPMI = 1} | {TPMI = 1} | {TPMI = 1} |
| 010 | {TPMI = 2} | {TPMI = 2} | {TPMI = 2} | {TPMI = 2} |
| 011 | {TPMI = 3} | {TPMI = 3} | {TPMI = 3} | {TPMI = 3} |
| 100 | {TPMI = 0, 1} | {TPMI = 0, 2} | {TPMI = 0, 1} | {TPMI = 0, 2} |
| 101 | {TPMI = 0, 1, 2} | {TPMI = 1, 3} | {TPMI = 0, 1, 2} | {TPMI = 1, 3} |
| 110 | reserved | reserved | {TPMI = 0, 1, 2, 3} | {TPMI = 0, 1, 2, 3} |
| 111 | reserved | reserved | reserved | reserved |

In one example, for a 2Tx UE, one of the above alternatives (e.g., Alt 1-1 through Alt 1-6) is used only when the UE is non-coherent (NC) (i.e., when the UE reports nonCoherent in it UE capability). In another example, for a 2Tx UE, one of the above alternatives (e.g., Alt 1-1 through Alt 1-6) is used regardless of whether the UE is non-coherent or full-coherent (i.e., when the UE reports nonCoherent or fullCoherent or fullAndpartialAndNonCoherent in it UE capability).

In one example, for a 4Tx UE, one of the above alternatives (e.g., Alt 1-1 through Alt 1-10) is used only when the UE is non-coherent (NC) (i.e., when the UE reports non- In one example, for a 4Tx partial-coherent UE, one of the above alternatives (e.g., Alt 1-1 through Alt 1-10) or one of the below alternatives (e.g., Alt 1-11 through Alt 1-14) is used.

In one alternative Alt 1-11, Z=2, B=1 for 4 antenna ports at the UE, and the vectors comprising TPMIs or TPMI groups are as shown in Table 21, where a few example sub-alternatives are shown.

TABLE 21

UE capability reporting for TPMI/TPMI group

| S = $b_0$ | Alt 1-11-1 | Alt 1-11-2 | Alt 1-11-3 | Alt 1-11-4 | Alt 1-11-5 |
|---|---|---|---|---|---|
| 0 | {TPMI = 4, 5, 6, 7} | {TPMI = 4, 5, 6, 7} | {TPMI = 0} | {TPMI = 0, 1, 2} | {TPMI= 0, 1, 2} |
| 1 | {TPMI = 8, 9, 10, 11} | {TPMI = 4, 5, . . . , 11} | {TPMI = 4, 5, 6, 7} | {TPMI = 4, 5, . . . , 11} | {TPMI = 0, 1, 2, 4, 5, . . . , 11} |

In one alternative Alt 1-12, Z=3, B=2 for 4 antenna ports at the UE, and the vectors comprising TPMIs or TPMI groups are as shown in Table 22, where a few example sub-alternatives are shown.

In one embodiment 2, a UE reports, via UE capability signaling, whether it is capable of full power UL transmission for codebook-based UL transmission. The UE may or may not report additional details about the UE capability

TABLE 22

UE capability reporting for TPMI/TPMI group

| S = $b_0 b_1$ | Alt 1-12-1 | Alt 1-12-2 | Alt 1-12-3 | Alt 1-12-4 | Alt 1-12-5 |
|---|---|---|---|---|---|
| 00 | {TPMI = 0} | {TPMI = 4, 5, 6, 7} | {TPMI = 0} | {TPMI = 0, 1, 2} | {TPMI = 0, 1, 2} |
| 01 | {TPMI = 4, 5, 6, 7} | {TPMI = 8, 9, 10, 11} | {TPMI = 4, 5, 6, 7} | {TPMI = 4, 5, 6, 7} | {TPMI = 0, 1, 2, 4, 5, 6, 7} |
| 10 | {TPMI = 8, 9, 10, 11} | {TPMI = 4, 5, . . . , 11} | {TPMI = 4, 5, . . . , 11} | {TPMI = 8, 9, 10, 11 | {TPMI = 0, 1, 2, 4, 5, 11} |
| 11 | reserved | reserved | reserved | reserved | reserved |

In Alt 1-13, Z=4, B=2 for 4 antenna ports at the UE, and the vectors comprising TPMIs or TPMI groups are as shown in Table 23, where a few example sub-alternatives are shown.

signaling. When the UE reports additional details about the UE capability signaling, then the additional detail includes a B-bit signaling, where the B-bit signaling S=$b_0$ $b_{B-1}$ indicates (reports) TPMIs or TPMI groups that can be used

TABLE 23

UE capability reporting for TPMI/TPMI group

| S = $b_0 b_1$ | Alt 1-13-1 | Alt 1-13-2 | Alt 1-13-3 | Alt 1-13-4 | Alt 1-13-5 |
|---|---|---|---|---|---|
| 00 | {TPMI = 0} | {TPMI = 0} | {TPMI = 0} | {TPMI = 0, 1, 2} | {TPMI = 0, 1, 2} |
| 01 | {TPMI = 1 or 2} | {TPMI = 4, 5, 6, 7} | {TPMI = 0, 1 or 0,2} | {TPMI = 4, 5, 6, 7} | {TPMI = 0, 1, 2 , 4, 5, 6, 7} |
| 10 | {TPMI = 4, 5, 6, 7} | {TPMI = 8, 9, 10, 11} | {TPMI = 4, 5, 6, 7} | {TPMI = 8, 9, 10, 11} | {TPMI = 0, 1, 2, 8, 9, 10, 11} |
| 11 | {TPMI = 8, 9, 10, 11} | {TPMI = 4, 5, . . . , 11} | {TPMI = 4, 5, . . . , 11} | {TPMI = 4, 5, . . . , 11} | {TPMI = 0, 1, 2, 4, 5, . . . , 11 |

In one alternative Alt 1-14, B=3 for 4 antenna ports at the UE, and the vectors comprising TPMIs or TPMI groups are as shown in Table 24, where a few example sub-alternatives are shown.

to transmit UL transmission at full power. In one example, each bit $b_i$ is associated with a TPMI or TPMI group in the UL codebook. In one example, a TPMI group is defined as a group (set) of TPMIs in the UL codebook that correspond

TABLE 24

UE capability reporting for TPMI/TPMI group

| S = $b_0 b_1$ | Alt 1-14-1 | Alt 1-14-2 | Alt 1-14-3 | Alt 1-14-4 | Alt 1-14-5 | Alt 1-14-6 |
|---|---|---|---|---|---|---|
| 000 | {TPMI = 0} | {TPMI = 0} | {TPMI = 0} | {TPMI = 0} | {TPMI = 0} | {TPMI = 0} |
| 001 | {TPMI = 1 or 2} | {TPMI = 1 or 2} | {TPMI = 0, 1 or 0, 2} | {TPMI = 0, 1 or 0, 2} | {TPMI = 1} | {TPMI = 0, 1} |
| 010 | {TPMI = 4, 5, 6, 7} | {TPMI = 0, 1 or 0, 2} | {TPMI = 0, 1, 2} | {TPMI = 0, 1, 2} | {TPMI = 2} | {TPMI = 0, 1, 2} |
| 011 | {TPMI = 8, 9, 10, 11} | {TPMI = 4, 5, 6, 7} | {TPMI = 4, 5, 6, 7} | {TPMI = 0, 1, 2, 3} | {TPMI = 3} | {TPMI = 0, 1, 2, 4, 5, 6, 7} |
| 100 | {TPMI = 4, 5, . . . , 11} | {TPMI = 8, 9, 10, 11} | {TPMI = 8, 9, 10, 11} | {TPMI = 4, 5, 6, 7} | {TPMI = 4, 5, 6, 7} | {TPMI = 0, 1, 2, 4, 5, . . . , 11} |
| 101 | reserved | {TPMI = 4, 5, . . . , 11} | {TPMI = 4, 5, . . . , 11} | {TPMI = 8, 9, 10, 11} | {TPMI = 8, 9, 10, 11} | reserved |
| 110 | reserved | reserved | reserved | {TPMI = 4, 5, . . . , 11} | {TPMI = 4, 5, . . . , 11} | reserved |
| 111 | reserved | reserved | reserved | reserved | reserved | reserved | to precoding matrices having zero and non-zero entries at the same location. In this example, each bit $b_i$ is associated with a length-N vector or matrix comprising of '0's and '1's, where N is number of antenna ports at the UE, e.g., $N \in \{2,4\}$.

For N=2 antenna ports, the B=2 and TPMI/TPMI groups is according to embodiment 1. For N=4 antenna ports, at least one of the following alternatives is used for this B-bit indication.

In one alternative Alt 2-1, the B-bit signaling indicates TPMIs or TPMI groups comprising (rank 1) vectors or (rank 2) matrices from a group G=(G1,G2), where the B value, and groups G1 and G2 are according to at least one of Table 25, Table 26, and Table 27.

TABLE 25

| UE capability reporting for 4Tx | | |
|---|---|---|
| Rank-1 Group (G1) | Rank-2 Group (G2) | B (# bits) |
| $\begin{bmatrix}1\\0\\0\\0\end{bmatrix}\begin{bmatrix}0\\1\\0\\0\end{bmatrix}\begin{bmatrix}0\\0\\1\\0\end{bmatrix}\begin{bmatrix}0\\0\\0\\1\end{bmatrix}$ | $\frac{1}{\sqrt{2}}\begin{bmatrix}1&0\\0&1\\0&0\\0&0\end{bmatrix}, \frac{1}{\sqrt{2}}\begin{bmatrix}1&0\\0&0\\0&0\\0&1\end{bmatrix}$ | 6 |

TABLE 26

| UE capability reporting for 4Tx | | |
|---|---|---|
| Rank-1 Group (G1) | Rank-2 Group (G2) | B (# bits) |
| $\begin{bmatrix}1\\0\\0\\0\end{bmatrix}\begin{bmatrix}0\\1\\0\\0\end{bmatrix}\begin{bmatrix}0\\0\\1\\0\end{bmatrix}\begin{bmatrix}0\\0\\0\\1\end{bmatrix}$ | $\frac{1}{\sqrt{2}}\begin{bmatrix}1&0\\0&1\\0&0\\0&0\end{bmatrix} \frac{1}{\sqrt{2}}\begin{bmatrix}1&0\\0&0\\0&0\\0&1\end{bmatrix} \frac{1}{\sqrt{2}}\begin{bmatrix}1&0\\0&0\\0&1\\0&0\end{bmatrix}$ | 7 |

TABLE 27

| UE capability reporting for 4Tx | | |
|---|---|---|
| Rank-1 Group (G1) | Rank-2 Group (G2) | B (# bits) |
| $\begin{bmatrix}1\\0\\0\\0\end{bmatrix}\begin{bmatrix}0\\1\\0\\0\end{bmatrix}\begin{bmatrix}0\\0\\1\\0\end{bmatrix}\begin{bmatrix}0\\0\\0\\1\end{bmatrix}$ | $\frac{1}{\sqrt{2}}\begin{bmatrix}1&0\\0&1\\0&0\\0&0\end{bmatrix} \frac{1}{\sqrt{2}}\begin{bmatrix}1&0\\0&0\\0&0\\0&1\end{bmatrix} \frac{1}{\sqrt{2}}\begin{bmatrix}1&0\\0&0\\0&1\\0&0\end{bmatrix} \frac{1}{\sqrt{2}}\begin{bmatrix}0&0\\1&0\\0&0\\0&1\end{bmatrix}$ | 8 |

In one alternative Alt 2-2, the B-bit signaling indicates TPMIs or TPMI groups comprising (rank 1) vectors or (rank 2) matrices from a group G=(G1,G2), where the B value, and groups G1 and G2 are according to at least one of Table 28, Table 29, and Table 30.

TABLE 28

| UE capability reporting for 4Tx | | |
|---|---|---|
| Rank-1 Group (G1) | Rank-2 Group (G2) | B (# bits) |
| $\begin{bmatrix}1\\0\\0\\0\end{bmatrix}\begin{bmatrix}0\\1\\0\\0\end{bmatrix}\begin{bmatrix}0\\0\\1\\0\end{bmatrix}\begin{bmatrix}0\\0\\0\\1\end{bmatrix} \frac{1}{\sqrt{2}}\begin{bmatrix}0\\1\\0\\1\end{bmatrix} \frac{1}{\sqrt{2}}\begin{bmatrix}1\\0\\1\\0\end{bmatrix}$ | $\frac{1}{\sqrt{2}}\begin{bmatrix}1&0\\0&1\\0&0\\0&0\end{bmatrix} \frac{1}{\sqrt{2}}\begin{bmatrix}1&0\\0&0\\0&0\\0&1\end{bmatrix}$ | 8 |

TABLE 29

| UE capability reporting for 4Tx | | |
|---|---|---|
| Rank-1 Group (G1) | Rank-2 Group (G2) | B (# bits) |
| $\begin{bmatrix}1\\0\\0\\0\end{bmatrix}\begin{bmatrix}0\\1\\0\\0\end{bmatrix}\begin{bmatrix}0\\0\\1\\0\end{bmatrix}\begin{bmatrix}0\\0\\0\\1\end{bmatrix} \frac{1}{\sqrt{2}}\begin{bmatrix}0\\1\\0\\1\end{bmatrix} \frac{1}{\sqrt{2}}\begin{bmatrix}1\\0\\1\\0\end{bmatrix}$ | $\frac{1}{\sqrt{2}}\begin{bmatrix}1&0\\0&1\\0&0\\0&0\end{bmatrix} \frac{1}{\sqrt{2}}\begin{bmatrix}1&0\\0&0\\0&0\\0&1\end{bmatrix} \frac{1}{\sqrt{2}}\begin{bmatrix}1&0\\0&0\\0&1\\0&0\end{bmatrix}$ | 9 |

TABLE 30

| UE capability reporting for 4Tx | | |
|---|---|---|
| Rank-1 Group (G1) | Rank-2 Group (G2) | B (# bits) |
| $\begin{bmatrix}1\\0\\0\\0\end{bmatrix} \begin{bmatrix}0\\1\\0\\0\end{bmatrix} \begin{bmatrix}0\\0\\1\\0\end{bmatrix} \begin{bmatrix}0\\0\\0\\1\end{bmatrix} \frac{1}{\sqrt{2}}\begin{bmatrix}0\\1\\0\\1\end{bmatrix} \frac{1}{\sqrt{2}}\begin{bmatrix}1\\0\\1\\0\end{bmatrix}$ | $\frac{1}{\sqrt{2}}\begin{bmatrix}1&0\\0&1\\0&0\\0&0\end{bmatrix} \frac{1}{\sqrt{2}}\begin{bmatrix}1&0\\0&0\\0&0\\0&1\end{bmatrix} \frac{1}{\sqrt{2}}\begin{bmatrix}1&0\\0&0\\0&1\\0&0\end{bmatrix} \frac{1}{\sqrt{2}}\begin{bmatrix}0&0\\1&0\\0&0\\0&1\end{bmatrix}$ | 10 |

In one alternative Alt 2-3, the B-bit signaling indicates TPMIs or TPMI groups comprising (rank 1) vectors or (rank 2) matrices from a group G=(G1,G2), where the B value, and groups G1 and G2 are according to at least one of Table 31, Table 32, and Table 33. In this alternative, the additional capability signaling is reported by only when the UE is non-coherent (NC) or partial coherent (PC).

TABLE 31

| UE capability reporting for 4Tx | | | |
|---|---|---|---|
| codebookSubset | Rank-1 Group (G1) | Rank-2 Group (G2) | B (# bits) |
| nonCoherent | $\begin{bmatrix}1\\0\\0\\0\end{bmatrix} \begin{bmatrix}0\\1\\0\\0\end{bmatrix} \begin{bmatrix}0\\0\\1\\0\end{bmatrix} \begin{bmatrix}0\\0\\0\\1\end{bmatrix}$ | $\frac{1}{\sqrt{2}}\begin{bmatrix}1&0\\0&1\\0&0\\0&0\end{bmatrix} \frac{1}{\sqrt{2}}\begin{bmatrix}1&0\\0&0\\0&0\\0&1\end{bmatrix}$ | 6 |
| partialAndNonCoherent | $\begin{bmatrix}1\\0\\0\\0\end{bmatrix} \begin{bmatrix}0\\1\\0\\0\end{bmatrix} \begin{bmatrix}0\\0\\1\\0\end{bmatrix} \begin{bmatrix}0\\0\\0\\1\end{bmatrix} \frac{1}{\sqrt{2}}\begin{bmatrix}0\\1\\0\\1\end{bmatrix} \frac{1}{\sqrt{2}}\begin{bmatrix}1\\0\\1\\0\end{bmatrix}$ | $\frac{1}{\sqrt{2}}\begin{bmatrix}1&0\\0&1\\0&0\\0&0\end{bmatrix} \frac{1}{\sqrt{2}}\begin{bmatrix}1&0\\0&0\\0&0\\0&1\end{bmatrix}$ | 8 |

TABLE 32

| UE capability reporting for 4Tx | | | |
|---|---|---|---|
| codebookSubset | Rank-1 Group (G1) | Rank-2 Group (G2) | B (# bits) |
| nonCoherent | $\begin{bmatrix}1\\0\\0\\0\end{bmatrix} \begin{bmatrix}0\\1\\0\\0\end{bmatrix} \begin{bmatrix}0\\0\\1\\0\end{bmatrix} \begin{bmatrix}0\\0\\0\\1\end{bmatrix}$ | $\frac{1}{\sqrt{2}}\begin{bmatrix}1&0\\0&1\\0&0\\0&0\end{bmatrix} \frac{1}{\sqrt{2}}\begin{bmatrix}1&0\\0&0\\0&0\\0&1\end{bmatrix} \frac{1}{\sqrt{2}}\begin{bmatrix}1&0\\0&0\\0&1\\0&0\end{bmatrix}$ | 7 |
| partialAndNonCoherent | $\begin{bmatrix}1\\0\\0\\0\end{bmatrix} \begin{bmatrix}0\\1\\0\\0\end{bmatrix} \begin{bmatrix}0\\0\\1\\0\end{bmatrix} \begin{bmatrix}0\\0\\0\\1\end{bmatrix} \frac{1}{\sqrt{2}}\begin{bmatrix}0\\1\\0\\1\end{bmatrix} \frac{1}{\sqrt{2}}\begin{bmatrix}1\\0\\1\\0\end{bmatrix}$ | $\frac{1}{\sqrt{2}}\begin{bmatrix}1&0\\0&1\\0&0\\0&0\end{bmatrix} \frac{1}{\sqrt{2}}\begin{bmatrix}1&0\\0&0\\0&0\\0&1\end{bmatrix} \frac{1}{\sqrt{2}}\begin{bmatrix}1&0\\0&0\\0&1\\0&0\end{bmatrix}$ | 9 |

TABLE 33

| UE capability reporting for 4Tx | | | |
|---|---|---|---|
| codebookSubset | Rank-1 Group (G1) | Rank-2 Group (G2) | B (# bits) |
| nonCoherent | $\begin{bmatrix}1\\0\\0\\0\end{bmatrix} \begin{bmatrix}0\\1\\0\\0\end{bmatrix} \begin{bmatrix}0\\0\\1\\0\end{bmatrix} \begin{bmatrix}0\\0\\0\\1\end{bmatrix}$ | $\frac{1}{\sqrt{2}}\begin{bmatrix}1&0\\0&1\\0&0\\0&0\end{bmatrix} \frac{1}{\sqrt{2}}\begin{bmatrix}1&0\\0&0\\0&0\\0&1\end{bmatrix} \frac{1}{\sqrt{2}}\begin{bmatrix}1&0\\0&0\\0&1\\0&0\end{bmatrix} \frac{1}{\sqrt{2}}\begin{bmatrix}0&0\\1&0\\0&0\\0&1\end{bmatrix}$ | 8 |

TABLE 33-continued

UE capability reporting for 4Tx

| codebookSubset | Rank-1 Group (G1) | Rank-2 Group (G2) | B (# bits) |
|---|---|---|---|
| partialAndNonCoherent | $\begin{bmatrix}1\\0\\0\\0\end{bmatrix} \begin{bmatrix}0\\1\\0\\0\end{bmatrix} \begin{bmatrix}0\\0\\1\\0\end{bmatrix} \begin{bmatrix}0\\0\\0\\1\end{bmatrix} \frac{1}{\sqrt{2}}\begin{bmatrix}0\\1\\0\\1\end{bmatrix} \frac{1}{\sqrt{2}}\begin{bmatrix}1\\0\\1\\0\end{bmatrix} \begin{bmatrix}1\\0\\0\\0\end{bmatrix}$ | $\frac{1}{\sqrt{2}}\begin{bmatrix}1&0\\0&1\\0&0\\0&0\end{bmatrix} \frac{1}{\sqrt{2}}\begin{bmatrix}1&0\\0&0\\0&0\\0&1\end{bmatrix} \frac{1}{\sqrt{2}}\begin{bmatrix}1&0\\0&0\\0&1\\0&0\end{bmatrix} \frac{1}{\sqrt{2}}\begin{bmatrix}0&0\\1&0\\0&0\\0&1\end{bmatrix}$ | 10 |

In one alternative Alt 2-4, the B-bit signaling indicates TPMIs or TPMI groups comprising (rank 1) vectors or (rank 2 or 3) matrices from a group G=(G1,G2,G3), where the B value, and groups G1, G2 and G3 are according to at least one of Table 34, Table 35, and Table 36.

TABLE 34

UE capability reporting for 4Tx

| Rank-1 Group (G1) | Rank-2 Group (G2) | Rank-3 Group (G3) | B (# bits) |
|---|---|---|---|
| $\begin{bmatrix}1\\0\\0\\0\end{bmatrix} \begin{bmatrix}0\\1\\0\\0\end{bmatrix} \begin{bmatrix}0\\0\\1\\0\end{bmatrix} \begin{bmatrix}0\\0\\0\\1\end{bmatrix}$ | $\frac{1}{\sqrt{2}}\begin{bmatrix}1&0\\0&1\\0&0\\0&0\end{bmatrix} \frac{1}{\sqrt{2}}\begin{bmatrix}1&0\\0&0\\0&0\\0&1\end{bmatrix}$ | $\frac{1}{\sqrt{3}}\begin{bmatrix}1&0&0\\0&1&0\\0&0&1\\0&0&0\end{bmatrix}$ | 7 |

TABLE 35

UE capability reporting for 4Tx

| Rank-1 Group (G1) | Rank-2 Group (G2) | Rank-3 Group (G3) | B (# bits) |
|---|---|---|---|
| $\begin{bmatrix}1\\0\\0\\0\end{bmatrix} \begin{bmatrix}0\\1\\0\\0\end{bmatrix} \begin{bmatrix}0\\0\\1\\0\end{bmatrix} \begin{bmatrix}0\\0\\0\\1\end{bmatrix}$ | $\frac{1}{\sqrt{2}}\begin{bmatrix}1&0\\0&1\\0&0\\0&0\end{bmatrix} \frac{1}{\sqrt{2}}\begin{bmatrix}1&0\\0&0\\0&0\\0&1\end{bmatrix} \frac{1}{\sqrt{2}}\begin{bmatrix}1&0\\0&0\\0&1\\0&0\end{bmatrix}$ | $\frac{1}{\sqrt{3}}\begin{bmatrix}1&0&0\\0&1&0\\0&0&1\\0&0&0\end{bmatrix}$ | 8 |

TABLE 36

UE capability reporting for 4Tx

| Rank-1 Group (G1) | Rank-2 Group (G2) | Rank-3 Group (G3) | B (# bits) |
|---|---|---|---|
| $\begin{bmatrix}1\\0\\0\\0\end{bmatrix} \begin{bmatrix}0\\1\\0\\0\end{bmatrix} \begin{bmatrix}0\\0\\1\\0\end{bmatrix} \begin{bmatrix}0\\0\\0\\1\end{bmatrix}$ | $\frac{1}{\sqrt{2}}\begin{bmatrix}1&0\\0&1\\0&0\\0&0\end{bmatrix} \frac{1}{\sqrt{2}}\begin{bmatrix}1&0\\0&0\\0&0\\0&1\end{bmatrix} \frac{1}{\sqrt{2}}\begin{bmatrix}1&0\\0&0\\0&1\\0&0\end{bmatrix} \frac{1}{\sqrt{2}}\begin{bmatrix}0&0\\1&0\\0&0\\0&1\end{bmatrix}$ | $\frac{1}{\sqrt{3}}\begin{bmatrix}1&0&0\\0&1&0\\0&0&1\\0&0&0\end{bmatrix}$ | 9 |

In one alternative Alt 2-5, the B-bit signaling indicates TPMIs or TPMI groups comprising (rank 1) vectors or (rank 2 or 3) matrices from a group G=(G1,G2,G3), where the B value, and groups G1, G2 and G3 are according to at least one of Table 37, Table 38, and Table 39.

TABLE 37

UE capability reporting for 4Tx

| Rank-1 Group (G1) | Rank-2 Group (G2) | Rank-3 Group (G3) | B (# bits) |
|---|---|---|---|
| $\begin{bmatrix}1\\0\\0\\0\end{bmatrix} \begin{bmatrix}0\\1\\0\\0\end{bmatrix} \begin{bmatrix}0\\0\\1\\0\end{bmatrix} \begin{bmatrix}0\\0\\0\\1\end{bmatrix} \frac{1}{\sqrt{2}}\begin{bmatrix}0\\1\\0\\1\end{bmatrix} \frac{1}{\sqrt{2}}\begin{bmatrix}1\\0\\1\\0\end{bmatrix}$ | $\frac{1}{\sqrt{2}}\begin{bmatrix}1 & 0\\0 & 1\\0 & 0\\0 & 0\end{bmatrix} \frac{1}{\sqrt{2}}\begin{bmatrix}1 & 0\\0 & 0\\0 & 0\\0 & 1\end{bmatrix}$ | $\frac{1}{\sqrt{3}}\begin{bmatrix}1 & 0 & 0\\0 & 1 & 0\\0 & 0 & 1\\0 & 0 & 0\end{bmatrix}$ | 9 |

TABLE 38

UE capability reporting for 4Tx

| Rank-1 Group (G1) | Rank-2 Group (G2) | Rank-3 Group (G3) | B (# bits) |
|---|---|---|---|
| $\begin{bmatrix}1\\0\\0\\0\end{bmatrix} \begin{bmatrix}0\\1\\0\\0\end{bmatrix} \begin{bmatrix}0\\0\\1\\0\end{bmatrix} \begin{bmatrix}0\\0\\0\\1\end{bmatrix} \frac{1}{\sqrt{2}}\begin{bmatrix}0\\1\\0\\1\end{bmatrix} \frac{1}{\sqrt{2}}\begin{bmatrix}1\\0\\1\\0\end{bmatrix}$ | $\frac{1}{\sqrt{2}}\begin{bmatrix}1 & 0\\0 & 1\\0 & 0\\0 & 0\end{bmatrix} \frac{1}{\sqrt{2}}\begin{bmatrix}1 & 0\\0 & 0\\0 & 0\\0 & 1\end{bmatrix} \frac{1}{\sqrt{2}}\begin{bmatrix}1 & 0\\0 & 0\\0 & 1\\0 & 0\end{bmatrix}$ | $\frac{1}{\sqrt{3}}\begin{bmatrix}1 & 0 & 0\\0 & 1 & 0\\0 & 0 & 1\\0 & 0 & 0\end{bmatrix}$ | 10 |

TABLE 39

UE capability reporting for 4Tx

| Rank-1 Group (G1) | Rank-2 Group (G2) | Rank-3 Group (G3) | B (# bits) |
|---|---|---|---|
| $\begin{bmatrix}1\\0\\0\\0\end{bmatrix} \begin{bmatrix}0\\1\\0\\0\end{bmatrix} \begin{bmatrix}0\\0\\1\\0\end{bmatrix} \begin{bmatrix}0\\0\\0\\1\end{bmatrix} \frac{1}{\sqrt{2}}\begin{bmatrix}0\\1\\0\\1\end{bmatrix} \frac{1}{\sqrt{2}}\begin{bmatrix}1\\0\\1\\0\end{bmatrix}$ | $\frac{1}{\sqrt{2}}\begin{bmatrix}1 & 0\\0 & 1\\0 & 0\\0 & 0\end{bmatrix} \frac{1}{\sqrt{2}}\begin{bmatrix}1 & 0\\0 & 0\\0 & 0\\0 & 1\end{bmatrix} \frac{1}{\sqrt{2}}\begin{bmatrix}1 & 0\\0 & 0\\0 & 1\\0 & 0\end{bmatrix} \frac{1}{\sqrt{2}}\begin{bmatrix}0 & 0\\1 & 0\\0 & 0\\0 & 1\end{bmatrix}$ | $\frac{1}{\sqrt{3}}\begin{bmatrix}1 & 0 & 0\\0 & 1 & 0\\0 & 0 & 1\\0 & 0 & 0\end{bmatrix}$ | 11 |

In one alternative Alt 2-6, the B-bit signaling indicates TPMIs or TPMI groups comprising (rank 1) vectors or (rank 2 or 3) matrices from a group G=(G1,G2,G3), where the B value, and groups G1, G2 and G3 are according to at least one of Table 37, Table 38, and Table 39 when codebookSubset=partialAndNonCoherent, and are according to at least one of Table 34, Table 35, and Table 36 when codebookSubset=nonCoherent.

In one example, the embodiment 1 and 2 and the alternatives and examples therein are also applicable to TPMIs or TPMI groups comprising (rank 1) vectors or (rank 2 or 3) matrices from a group G=(G1,G2,G3), where the scaling of the vectors or matrices are different from those in embodiment 1 and 2. For example, the scaling of the vectors or matrices can be ½ for 4 antenna ports and for 2 antenna ports.

In one embodiment 3, a UE reports, via UE capability signaling (e.g., UL full power mode2), whether it is capable of full power UL transmission for codebook-based UL transmission. The UE may or may not report additional details about the UE capability signaling, i.e., any additional details (e.g., TPMI or TPMI group signaling) is subject to UE capability, i.e., it can be optional feature to a UE. When the UE reports additional details about the UE capability signaling, then the additional detail includes a B-bit signaling, where the B-bit signaling $S=b_0 \ldots b_{B-1}$ indicates (reports) a TPMI or a TPMI group that can be used to transmit UL transmission at full power.

In one alternative Alt 3-1, for N=4 antenna ports, the number of bits (B) to indicate a TPMI/TPMI group, which can deliver UL full power, is B=2 for a non-coherent UE, and B=3 for a partial-coherent UE. For a non-coherent UE, the mapping of 2-bit indication to TPMI groups is as shown in Table 40, where the TPMI groups are defined in Table 42. For a partial-coherent UE, the mapping of 3-bit indication to TPMI groups is as shown in Table 41, where the TPMI groups are defined in Table 42 and two alternatives (Alt A and Alt B) are shown for the exact mapping.

Figure 12:
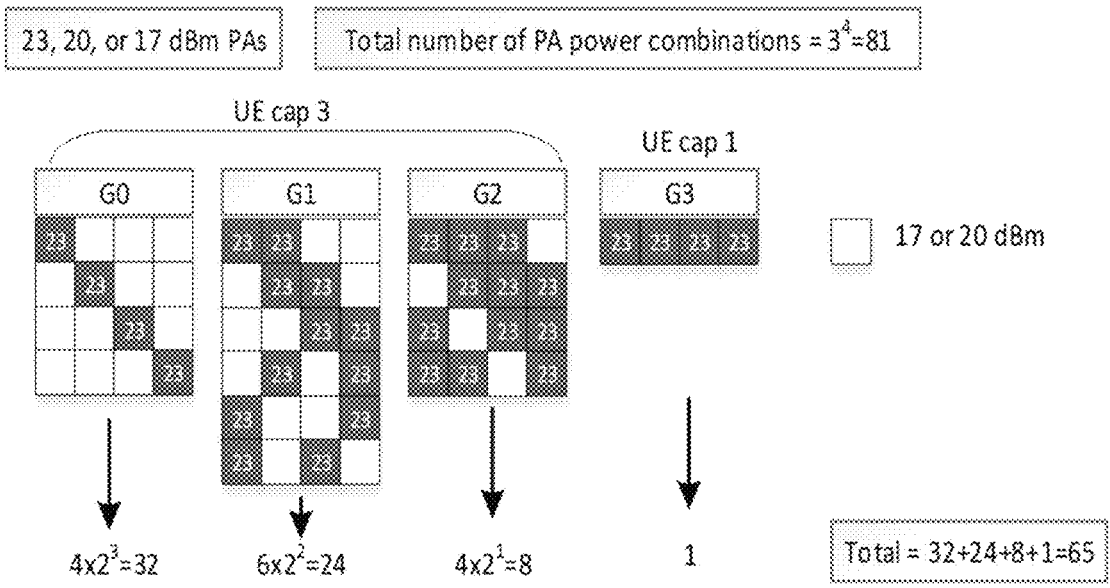
FIG. 12 illustrates an example of TPMI grouping based on power amplifier (PA) power values according to embodiments of the present disclosure.
Figure 12:
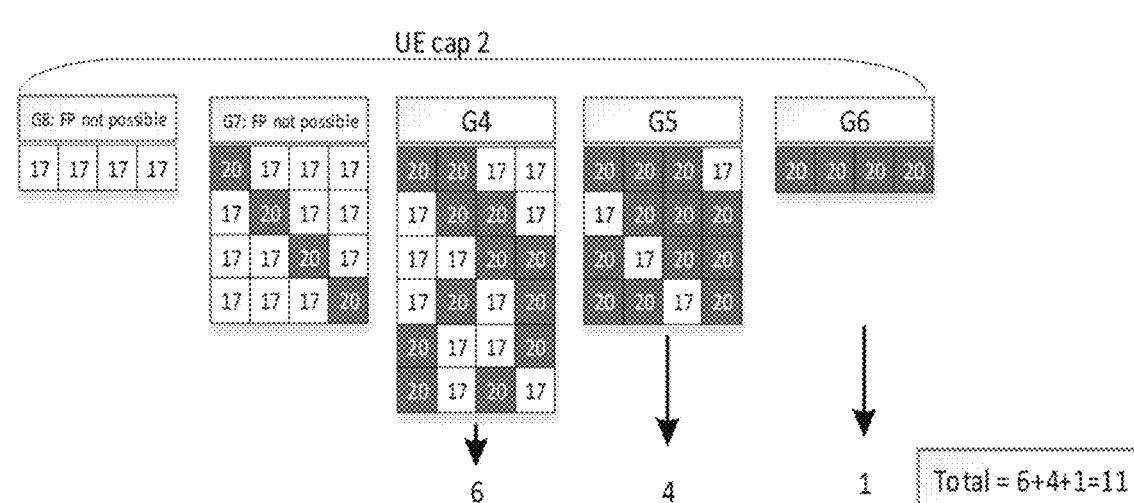

FIG. 12 illustrates an example of TPMI grouping 1200 based on power amplifier (PA) power values according to embodiments of the present disclosure. The embodiment of the TPMI grouping 1200 illustrated in FIG. 12 is for illustration only. FIG. 12 does not limit the scope of this disclosure to any particular implementation of the TPMI grouping 1200.

TABLE 40 mapping of 2-bit indication to TPMI or TPMI grouping
for non-coherent UE with 4 antenna ports

| $S = b_0b_1$ or $b_1b_0$ | TPMI or TPMI groups |
|---|---|
| 00 | G0 |
| 01 | G1 |
| 10 | G2 |
| 11 | G3 |

TABLE 41 mapping of 3-bit indication to TPMI or TPMI grouping for partial-coherent UE with 4 antenna ports

| $S = b_0 b_1 b_2$ or $b_2 b_1 b_0$ | Alt A: TPMI or TPMI groups | Alt B: TPMI or TPMI groups |
|---|---|---|
| 000 | G0 | reserved |
| 001 | G1 | G0 |
| 010 | G2 | G1 |
| 011 | G3 | G2 |
| 100 | G4 | G3 |
| 101 | G5 | G4 |
| 110 | G6 | G5 |
| 111 | reserved | G6 |

TABLE 42

Example of TPMI groups

| TPMI Groups | TPMI pre-coder/pre-coding matrices | TPMIs in UL codebook: (Table 2 for rank 1, Table 4 for rank 2, and Table 5 for rank 3) |
|---|---|---|
| G0 | $\frac{1}{2}\begin{bmatrix}1\\0\\0\\0\end{bmatrix}$ | Rank 1 TPMI 0 |
| G1 | $\left\{\frac{1}{2}\begin{bmatrix}1\\0\\0\\0\end{bmatrix}, \frac{1}{2}\begin{bmatrix}0\\0\\1\\0\end{bmatrix}\right\}, \left\{\frac{1}{2}\begin{bmatrix}1&0\\0&0\\0&1\\0&0\end{bmatrix}\right\}$ | Rank 1 TPMI 0, 2; Rank 2 TPMI 1 |
| G2 | $\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\}; \left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}; \frac{1}{2}\begin{bmatrix}1&0&0\\0&1&0\\0&0&1\\0&0&0\end{bmatrix}$ | Rank 1 TPMI 0, 1, 2; Rank 2 TPMI 0, 1, 3; Rank 3 TPMI 0 |
| G3 | $\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}; \frac{1}{2}\begin{bmatrix}1&0&0\\0&1&0\\0&0&1\\0&0&0\end{bmatrix}$ | Rank 2 TPMI 0, 1, 3; Rank 3 TPMI 0 |
| G4 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}; \frac{1}{2}\begin{bmatrix}1&0\\0&0\\0&1\\0&0\end{bmatrix}$ | Rank 1 TPMI 4, 5, 6, 7; Rank 2 TPMI 1; |
| G5 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}; \left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}; \frac{1}{2}\begin{bmatrix}1&0&0\\0&1&0\\0&0&1\\0&0&0\end{bmatrix}$ | Rank 1 TPMI 4, 5, 6, 7; Rank 2 TPMI 0, 1, 3; Rank 3 TPMI 0 |
| G6 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}; \left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\};$ $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\}; \frac{1}{2}\begin{bmatrix}1&0&0\\0&1&0\\0&0&1\\0&0&0\end{bmatrix}$ | Rank 1 TPMI 4, 5, 6, 7, 8, 9, 10, 11; Rank 2 TPMI 0, 1, 2, 3, 4, 5; Rank 3 TPMI 0 |

In Alt 3-2, for N=4 antenna ports, the number of bits (B) to indicate a TPMI/TPMI group, which can deliver UL full power, is B=2 for a non-coherent UE, and B=4 for a partial-coherent UE. For a non-coherent UE, the mapping of 2-bit indication to TPMI groups is as shown in Table 40, where the TPMI groups are defined in Table 42. For a partial-coherent UE, the mapping of 4-bit indication to TPMI groups is as shown in Table 43, where the TPMI groups are defined in Table 42 and three alternatives (Alt A, Alt B, and Alt C) are shown for the exact mapping. In Alt A and Alt B, the nine states are reserved, and not mapped to any other TPMI groups. In Alt C, the nines states are mapped to nine additional TPMI groups. An example is shown in the table. In one example, in case of Alt A or Alt B, the one bit (e.g., MSB $b_0$ or $b_3$) of the four bits is used to indicate, whether the UE is reporting any TPMI groups, for example, by setting it to 0 (Alt A) or 1 (Alt B).

TABLE 1 mapping of 4-bit indication to TPMI or TPMI grouping for partial-coherent UE with 4 antenna ports

| $S = b_0b_1b_2b_3$ or $b_3b_2b_1b_0$ | Alt A: TPMI or TPMI groups | Alt B: TPMI or TPMI groups | Alt C: TPMI or TPMI groups |
|---|---|---|---|
| 0000 | G0 | reserved | G0 |
| 0001 | G1 | reserved | G1 |
| 0010 | G2 | reserved | G2 |
| 0011 | G3 | reserved | G3 |
| 0100 | G4 | reserved | G4 |
| 0101 | G5 | reserved | G5 |
| 0110 | G6 | reserved | G6 |
| 0111 | reserved | reserved | union of groups {G0, G4} |
| 1000 | reserved | reserved | union of groups {G0, G5} |
| 1001 | reserved | G0 | union of groups {G0, G6} |
| 1010 | reserved | G1 | union of groups {G1, G4} |
| 1011 | reserved | G2 | union of groups {G1, G5} |
| 1100 | reserved | G3 | union of groups {G1, G6} |
| 1101 | reserved | G4 | union of groups {G2, G4} |
| 1110 | reserved | G5 | union of groups {G2, G5} |
| 1111 | reserved | G6 | union of groups {G2, G6} |

In a variation of embodiment 3, a rank 1 TPMI 0 and TPMI 0,1 for 2 antenna ports is also included in G0, G1, and G2. For example, the rank 1 TPMI 0 indicating $$\left\{ \frac{1}{\sqrt{2}} \begin{bmatrix} 1 \\ 0 \end{bmatrix} \right\}$$

is included in G0, and the rank 1 TPMI 0,1 indicating $$\left\{ \frac{1}{\sqrt{2}} \begin{bmatrix} 1 \\ 0 \end{bmatrix}, \frac{1}{\sqrt{2}} \begin{bmatrix} 0 \\ 1 \end{bmatrix} \right\}$$

is included in G0 and G1.

Figure 13:
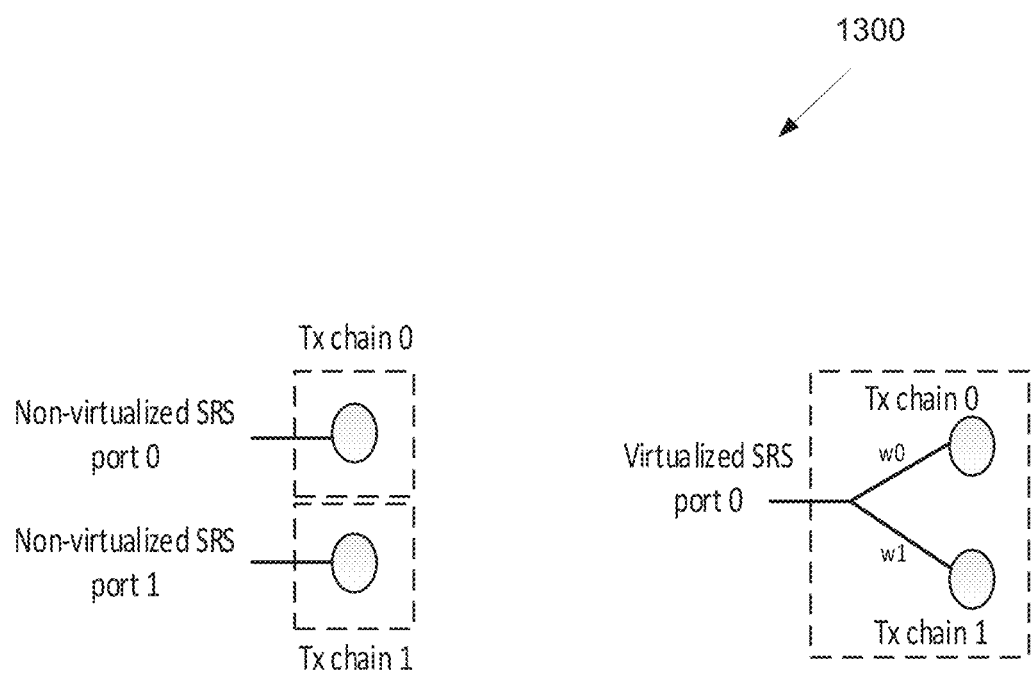
FIG. 13 illustrates an example of a virtualized SRS port for a UE with two Tx chains according to embodiments of the present disclosure.

FIG. 13 illustrates an example of a virtualized SRS port 1300 for a UE with two Tx chains according to embodiments of the present disclosure, where $w_0$ and $w_1$ are virtualization weights used at the two Tx chains. The embodiment of the virtualized SRS port 1300 illustrated in FIG. 13 is for illustration only. FIG. 13 does not limit the scope of this disclosure to any particular implementation of the virtualized SRS port 1300.

In one embodiment 4, a UE reports, via UE capability signaling, whether it is capable of full power UL transmission based on "virtualized" SRS transmission. When the UE is capable of full power UL transmission based on "virtualized" SRS transmission, then the UE is configured with at least one of the following two types of SRS resources (either in one SRS resource set or in two different SRS resource sets):

Type 1 (non-virtualized or non-precoded): comprises $K_1$ SRS resources with $N_1$ SRS ports, where $N_1$ equals the number of Tx chains (or antenna ports) at the UE, where $K_1 \geq 1$ Type 2 (virtualized or precoded): comprises $K_2$ SRS resources with $N_2$ SRS ports, where $N_2$ is less than the number of Tx chains (or antenna ports) at the UE, where $K_2 \geq 1$.

For the Type 1 SRS resources, the UE does not virtualize (precode) multiple Tx chains (or antenna ports) before transmitting SRS resources from them. For the Type 2 SRS resources, on the other hand, the UE virtualizes (precodes) multiple Tx chains (or antenna ports) to obtain $N_2$ SRS ports before transmitting SRS resources from them. The virtualization weight (or precoding vector) is either transparent (not known at the gNB) or is reported by the UE to the gNB or is configured by the gNB (e.g., via TPMI together with SRS configuration). Here, the virtualization refers to assigning (using) non-zero weights to multiple Tx chains and combing the weighted Tx chains to form a single "virtualized" SRS port (or virtualized Tx chain). In one example, for the Type 2 SRS resources, the UE may be further configured with CSI-RS resources (e.g., via associated-CSIRS configuration) to link the virtualized SRS resources with CSI-RS resources, where the CSI-RS resources are measured by the UE to obtain virtualization weights (precoding vectors) to virtualize the corresponding Type 2 SRS resources.

In one example, $N_1 \in \{2,4\}$. In one example, $N_2=1$ is fixed. In one example, $N_2 \in \{1,2\}$. In one example, $N_2 \in \{1,2,3\}$. In one example, $N_2 \in \{1,2,3,4\}$. In one example, $N_2 \in \{1,2,4\}$. In one example, $N_2 \in \{1, \ldots, N_1\}$.

In one example, when $K_2 > 1$, then the number of SRS ports ($N_2$) in each Type 2 SRS resource is the same. In another example, when $K_2 > 1$, then the number of SRS ports ($N_2$) in different Type 2 SRS resources can be different.

The UE transmits Type 1 and/or 2 SRS resources according to the SRS configuration received from the gNB. The gNB measures the corresponding SRS ports and calculates SRI/TPMI, and indicates the calculated SRI/TPMI to the UE (e.g., via DCI or higher layer RRC signaling). The UE uses SRI/TPMI to select a SRS resource and corresponding SRS ports (with non-zero power) for UL (PUSCH) transmission. The PUSCH power (via UL power control) is scaled by a factor $$\beta = \frac{\rho_0}{\rho},$$

where $\rho_0$=number of SRS ports with non-zero power, and $\rho$=number of SRS ports in SRS resource indicated by SRI.

A few embodiments, which are variations or examples of embodiment 4, are as follows.

In one embodiment 4A, a UE reports, via UE capability signaling, whether it is capable of full power UL transmission based on "virtualized" SRS transmission. When the UE is capable of full power UL transmission based on "virtualized" SRS transmission, then the UE is configured with only one of the two types SRS resources (e.g., in one SRS resource set), i.e., either Type 1 or Type 2, not both. When configured with Type 1 SRS resources, the UE transmits SRS resource without any virtualization. When configured with Type 2 SRS resources, the UE transmits SRS resource with virtualization (as explained in embodiment 1). The gNB measures the SRS ports and indicates SRI/TPMI to the UE for UL transmission. In one example, the type of SRS is configured via higher layer RRC signaling. In another example, the type of SRS is configured via MAC CE based signaling. In another example, the type of SRS is configured via DCI.

In one embodiment 4B, when the number of Tx chains (or antenna ports) at the UE is 2, then the UE is configured with two types of SRS resources (either in one SRS resource set or in two different SRS resource sets):

Type 1 (non-virtualized or non-precoded): comprises $K_1$ SRS resources with $N_1=2$ SRS ports, where $K_1 \geq 0$ Type 2 (virtualized or precoded): comprises $K_2$ SRS resources with $N_2=1$ SRS port, where $K_2 \geq 0$.

At least one of $K_1$ and $K_2$ is greater than 1, i.e., $K_1=K_2=0$ is not possible. The UE transmits Type 1 and/or 2 SRS resources (with or without virtualization as explained in embodiment 1). The gNB measures these SRS resources, and indicates SRI to the UE. When the SRI indicates a Type 1 SRS resource, then TPMI corresponding to rank 1 or 2 (or rank 1 to ULmaxRank where ULmaxRank is RRC configured) transmission is also indicated. When the SRI indicates a Type 2 SRS resource, then there is no TPMI indication, and the selected resource indicates a port for rank 1 transmission. At least one of the following examples is used for $K_1$ and $K_2$.

In one example Ex 4B-0: $K_2=0$, $K_1=1$
In one example Ex 4B-1: $K_2=1$, $K_1=0$
In one example Ex 4B-2: $K_2=1$, $K_1=1$
In one example Ex 4B-3: $K_2=1$, $K_1 \geq 1$
In one example Ex 4B-4: $K_2=1$, $K_1>1$
In one example Ex 4B-5: $K_2 \geq 1$, $K_1=1$
In one example Ex 4B-6: $K_2>1$, $K_1=1$
In one example Ex 4B-7: $K_2 \geq 1$, $K_1 \geq 1$
In one example Ex 4B-8: $K_2>1$, $K_1 \geq 1$
In one example Ex 4B-9: $K_2 \geq 1$, $K_1>1$
In one example Ex 4B-10: $K_2>1$, $K_1>1$ The SRI reporting is according to at least one of the following alternatives.

In one alternative Alt 4B-0: a joint SRI is used to select (a) one of the two types of SRS resources, and (b) a SRS resource within the selected type of SRS resources. In one example, this requires a $\lceil \log_2 (K_1+K_2) \rceil$-bit indication.

In one alternative Alt 4B-1: two separate SRIs, (SRI1, SRI2), are used, where SRI1 is used to select one of the two types of SRS resources, and SRI2 is used to indicate a SRS resource within the selected type of SRS resources. In one example, SRI1 requires a 1-bit indication, and SRI2 requires a $\lceil \log_2 K_1 \rceil$-bit indication if SRI1 indicates Type 1 SRS resources, and a $\lceil \log_2 K_2 \rceil$-bit indication if SRI1 indicates Type 2 SRS resources.

Note that, when $K_1=K_2=1$, then the two alternatives are equivalent since SRI2 is not indicated (not needed). Note also that, when $K_1=1$ and SRI1 indicates Type 1 SRS resources, then SRI2 is not indicated. Likewise, when $K_2=1$ and SRI1 indicates Type 2 SRS resources, then SRI2 is not indicated. In one example, SRI1 is indicated/configured via higher layer RRC signaling. In another example, SRI1 is indicated/configured via MAC CE based signaling. In another example, SRI1 is indicated/configured via DCI.

In one embodiment 4C, when the number of Tx chains (or antenna ports) at the UE is 2, then the UE is configured with two types of SRS resources (either in one SRS resource set or in two different SRS resource sets):

Type 1 (non-virtualized or non-precoded): comprises $K_1$ SRS resources with $N_1=2$ SRS ports, where $K_1 \geq 0$ Type 2 (virtualized or precoded): comprises $K_2$ SRS resources with $N_2=1$ SRS port, where $K_2 \geq 0$.

At least one of $K_1$ and $K_2$ is greater than 1, i.e., $K_1=K_2=0$ is not possible. The UE transmits Type 1 and/or 2 SRS resources (with or without virtualization as explained in embodiment 1). The gNB measures these SRS resources, and indicates SRI to the UE. When the SRI indicates a Type 1 SRS resource, then TPMI corresponding to rank 1 or 2 transmission is also indicated. When the SRI indicates Type 2 SRS, then there is no TPMI indication, and the SRI either selects a single SRS resource indicating a port for rank 1 transmission or two SRS resources indicating two ports for rank 2 transmission (assuming identity precoding, i.e., 1 layer per port). At least one of the examples (4B-0 through 4B-10) is used for $K_1$ and $K_2$. The SRI reporting is according to at least one of the following alternatives.

In one alternative Alt 4C-0: a joint SRI is used to select either (a) a type 1 SRS resource, or (b) a single Type 2 SRS resource or (c) two Type 2 SRS resources. In one example, this requires a $$\left\lceil \log_2 \left( K_1 + K_2 + \binom{K_2}{2} \right) \right\rceil \text{-bit}$$

indication.

In one alternative Alt 4C-1: two separate SRIs, (SRI1, SRI2), are used, where SRI1 is used to select one of the two types of SRS resources, and SRI2 is used to indicate SRS resource(s) within the selected type of SRS resources. In one example, SRI1 requires a 1-bit indication, and SRI2 requires a $\lceil \log_2 K_1 \rceil$-bit indication if SRI1 indicates Type 1 SRS resources, and a $$\left\lceil \log_2 \left( K_2 + \binom{K_2}{2} \right) \right\rceil \text{-bit}$$

indication if SRI1 indicates Type 2 SRS resources.

Note that, when $K_1=K_2=1$, then the two alternatives are equivalent since SRI2 is not indicated (not needed). Note also that, when $K_1=1$ and SRI1 indicates Type 1 SRS resources, then SRI2 is not indicated. Likewise, when $K_2=1$ and SRI1 indicates Type 2 SRS resources, then SRI2 is not indicated. In one example, SRI1 is indicated/configured via higher layer RRC signaling. In another example, SRI1 is indicated/configured via MAC CE based signaling. In another example, SRI1 is indicated/configured via DCI.

In one embodiment 4D, when the number of Tx chains (or antenna ports) at the UE is 2, then the UE is configured with two types of SRS resources (either in one SRS resource set or in two different SRS resource sets):

Type 1 (non-virtualized or non-precoded): comprises $K_1$ SRS resources with $N_1=2$ SRS ports, where $K_1 \geq 0$ Type 2 (virtualized or precoded): comprises $K_2$ SRS resources with $N_2=1$ SRS port, where $K_2 \geq 0$.

At least one of $K_1$ and $K_2$ is greater than 1, i.e., $K_1=K_2=0$ is not possible. The UE transmits Type 1 and/or 2 SRS resources (with or without virtualization as explained in embodiment 1). The gNB measures these SRS resources, and indicates SRI to the UE. When the SRI indicates a Type 1 SRS resource, then TPMI corresponding to rank 1 or 2 transmission is also indicated. When the SRI indicates a single Type 2 SRS resource, then there is no TPMI indication, and the single SRS resource indicates a port for rank 1 transmission. When the SRI indicates two Type 2 SRS resources, then there is TPMI indication, and two SRS resources indicates two ports for at least one of the following transmission ranks (i) rank 1 only transmission (via rank 1 TPMIs), (ii) rank 2 only transmission (via rank 2 TPMIs), (iii) for rank 1 or 2 transmission (via rank 1-2 TPMIs).

At least one of the examples (4B-0 through 4B-10) is used for $K_1$ and $K_2$. The SRI reporting is according to at least one of the following alternatives.

In one alternative Alt 4D-0: a joint SRI is used to select either (a) a type 1 SRS resource, or (b) a single Type 2 SRS resource or (c) two Type 2 SRS resources. In one example, this requires a $$\left\lceil \log_2\left(K_1 + K_2 + \binom{K_2}{2}\right) \right\rceil \text{-bit}$$

indication.

In one alternative Alt 4D-1: two separate SRIs, (SRI1, SRI2), are used, where SRI1 is used to select one of the two types of SRS resources, and SRI2 is used to indicate SRS resource(s) within the selected type of SRS resources. In one example, SRI1 requires a 1-bit indication, and SRI2 requires a $\lceil \log_2 K_1 \rceil$-bit indication if SRI1 indicates Type 1 SRS resources, and a $$\left\lceil \log_2\left(K_2 + \binom{K_2}{2}\right) \right\rceil \text{-bit}$$

indication if SRI1 indicates Type 2 SRS resources.

Note that, when $K_1=K_2=1$, then the two alternatives are equivalent since SRI2 is not indicated (not needed). Note also that, when $K_1=1$ and SRI1 indicates Type 1 SRS resources, then SRI2 is not indicated. Likewise, when $K_2=1$ and SRI1 indicates Type 2 SRS resources, then SRI2 is not indicated. In one example, SRI1 is indicated/configured via higher layer RRC signaling. In another example, SRI1 is indicated/configured via MAC CE based signaling. In another example, SRI1 is indicated/configured via DCI.

In one embodiment 4E, when the number of Tx chains (or antenna ports) at the UE is 2, then the UE is configured with two types of SRS resources (either in one SRS resource set or in two different SRS resource sets):
Type 1 (non-virtualized or non-precoded): comprises $K_1$ SRS resources with $N_1=2$ SRS ports, where $K_1 \geq 0$
Type 2 (virtualized or precoded): comprises $K_2$ SRS resources with $N_2=1$ SRS port, where $K_2 \geq 0$.

At least one of $K_1$ and $K_2$ is greater than 1, i.e., $K_1=K_2=0$ is not possible. The UE transmits Type 1 and/or 2 SRS resources (with or without virtualization as explained in embodiment 1). The gNB measures these SRS resources, and indicates SRI to the UE. When the SRI indicates a Type 1 SRS resource, then TPMI corresponding to rank 1 or 2 transmission is also indicated. When the SRI indicates a single Type 2 SRS resource, then there is no TPMI indication, and the single SRS resource indicates a port for rank 1 transmission. When the SRI indicates two Type 2 SRS resources, then either (a) there is TPMI indication (indicating identity precoding), and two SRS resources indicates two ports for rank 2 transmission (assuming identity precoding, i.e., 1 layer per port) or (b) there is TPMI indication (indicating non-identity precoding), and two SRS resources indicates two ports for at least one of the following transmission ranks (i) rank 1 only transmission (via rank 1 TPMIs), (ii) rank 2 only transmission (via rank 2 TPMIs), (iii) for rank 1 or 2 transmission (via rank 1-2 TPMIs).

At least one of the examples (4B-0 through 4B-10) is used for $K_1$ and $K_2$. The SRI reporting is according to at least one of the following alternatives.

In one alternative Alt 4E-0: a joint SRI is used to select either (a) a type 1 SRS resource, or (b) a single Type 2 SRS resource or (c) two Type 2 SRS resources. In one example, this requires a $$\left\lceil \log_2\left(K_1 + K_2 + \binom{K_2}{2}\right) \right\rceil \text{-bit}$$

indication.

In one alternative Alt 4E-1: two separate SRIs, (SRI1, SRI2), are used, where SRI1 is used to select one of the two types of SRS resources, and SRI2 is used to indicate SRS resource(s) within the selected type of SRS resources. In one example, SRI1 requires a 1-bit indication, and SRI2 requires a $\lceil \log_2 K_1 \rceil$-bit indication if SRI1 indicates Type 1 SRS resources, and a $$\left\lceil \log_2\left(K_2 + \binom{K_2}{2}\right) \right\rceil \text{-bit}$$

indication if SRI1 indicates Type 2 SRS resources.

Note that, when $K_1=K_2=1$, then the two alternatives are equivalent since SRI2 is not indicated (not needed). Note also that, when $K_1=1$ and SRI1 indicates Type 1 SRS resources, then SRI2 is not indicated. Likewise, when $K_2=1$ and SRI1 indicates Type 2 SRS resources, then SRI2 is not indicated. In one example, SRI1 is indicated/configured via higher layer RRC signaling. In another example, SRI1 is indicated/configured via MAC CE based signaling. In another example, SRI1 is indicated/configured via DCI.

In one embodiment 4F, when the number of Tx chains (or antenna ports) at the UE is 4, then the UE is configured with two types of SRS resources (either in one SRS resource set or in two different SRS resource sets):
Type 1 (non-virtualized or non-precoded): comprises $K_1$ SRS resources with $N_1=4$ SRS ports, where $K_1 \geq 0$
Type 2 (virtualized or precoded): comprises $K_2$ SRS resources with $N_2=1$ SRS port, where $K_2 \geq 0$.

At least one of $K_1$ and $K_2$ is greater than 1, i.e., $K_1=K_2=0$ is not possible. The UE transmits Type 1 and/or 2 SRS resources (with or without virtualization as explained in embodiment 1). The gNB measures these SRS resources, and indicates SRI to the UE. When the SRI indicates a Type 1 SRS resource, then TPMI corresponding to rank 1 or 2 or 3 or 4 (or rank 1 to ULmaxRank where ULmaxRank is RRC configured) transmission is also indicated. When the SRI indicates a Type 2 SRS resource, then there is no TPMI indication, and the selected resource indicates a port for rank 1 transmission. At least one of the examples (4B-0 through 4B-10) is used for $K_1$ and $K_2$. The SRI reporting is according at least one of Alt 4B-0 and Alt 4B-1. The rest of the details about SRI indication is the same as in embodiment 4B.

In one embodiment 4G, when the number of Tx chains (or antenna ports) at the UE is 4, then the UE is configured with two types of SRS resources (either in one SRS resource set or in two different SRS resource sets):
- Type 1 (non-virtualized or non-precoded): comprises $K_1$ SRS resources with $N_1=4$ SRS ports, where $K_1 \geq 0$
- Type 2 (virtualized or precoded): comprises $K_2$ SRS resources with $N_2=1$ SRS port, where $K_2 \geq 0$.

At least one of $K_1$ and $K_2$ is greater than 1, i.e., $K_1=K_2=0$ is not possible. The UE transmits Type 1 and/or 2 SRS resources (with or without virtualization as explained in embodiment 1). The gNB measures these SRS resources, and indicates SRI to the UE. When the SRI indicates a Type 1 SRS resource, then TPMI corresponding to rank 1 or 2 or 3 or 4 transmission is also indicated. When the SRI indicates Type 2 SRS, then there is no TPMI indication, and the SRI either selects a single SRS resource indicating a port for rank 1 transmission or two SRS resources indicating two ports for rank 2 transmission (assuming identity precoding, i.e., 1 layer per port). At least one of the examples (4B-0 through 4B-10) is used for $K_1$ and $K_2$. The SRI reporting is according at least one of Alt 4C-0 and Alt 4C-1. The rest of the details about SRI indication is the same as in embodiment 4C.

In one embodiment 4H, when the number of Tx chains (or antenna ports) at the UE is 4, then the UE is configured with two types of SRS resources (either in one SRS resource set or in two different SRS resource sets):
- Type 1 (non-virtualized or non-precoded): comprises $K_1$ SRS resources with $N_1=4$ SRS ports, where $K_1 \geq 0$
- Type 2 (virtualized or precoded): comprises $K_2$ SRS resources with $N_2=1$ SRS port, where $K_2 \geq 0$.

At least one of $K_1$ and $K_2$ is greater than 1, i.e., $K_1=K_2=0$ is not possible. The UE transmits Type 1 and/or 2 SRS resources (with or without virtualization as explained in embodiment 1). The gNB measures these SRS resources, and indicates SRI to the UE. When the SRI indicates a Type 1 SRS resource, then TPMI corresponding to rank 1 or 2 or 3 or 4 transmission is also indicated. When the SRI indicates a single Type 2 SRS resource, then there is no TPMI indication, and the single SRS resource indicates a port for rank 1 transmission. When the SRI indicates two Type 2 SRS resources, then there is TPMI indication, and two SRS resources indicates two ports for at least one of the following transmission ranks (i) rank 1 only transmission (via rank 1 TPMIs), (ii) rank 2 only transmission (via rank 2 TPMIs), (iii) for rank 1 or 2 transmission (via rank 1-2 TPMIs). At least one of the examples (4B-0 through 4B-10) is used for $K_1$ and $K_2$. The SRI reporting is according at least one of Alt 4D-0 and Alt 4D-1. The rest of the details about SRI indication is the same as in embodiment 1D.

In one embodiment 4I, when the number of Tx chains (or antenna ports) at the UE is 4, then the UE is configured with two types of SRS resources (either in one SRS resource set or in two different SRS resource sets):
- Type 1 (non-virtualized or non-precoded): comprises $K_1$ SRS resources with $N_1=4$ SRS ports, where $K_1 \geq 0$
- Type 2 (virtualized or precoded): comprises $K_2$ SRS resources with $N_2=1$ SRS port, where $K_2 \geq 0$.

At least one of $K_1$ and $K_2$ is greater than 1, i.e., $K_1=K_2=0$ is not possible. The UE transmits Type 1 and/or 2 SRS resources (with or without virtualization as explained in embodiment 1). The gNB measures these SRS resources, and indicates SRI to the UE. When the SRI indicates a Type 1 SRS resource, then TPMI corresponding to rank 1 or 2 or 3 or 4 transmission is also indicated. When the SRI indicates a single Type 2 SRS resource, then there is no TPMI indication, and the single SRS resource indicates a port for rank 1 transmission. When the SRI indicates two Type 2 SRS resources, then either (a) there is TPMI indication (indicating identity precoding), and two SRS resources indicates two ports for rank 2 transmission (assuming identity precoding, i.e., 1 layer per port) or (b) there is TPMI indication (indicating non-identity precoding), and two SRS resources indicates two ports for at least one of the following transmission ranks (i) rank 1 only transmission (via rank 1 TPMIs), (ii) rank 2 only transmission (via rank 2 TPMIs), (iii) for rank 1 or 2 transmission (via rank 1-2 TPMIs). At least one of the examples (1B-0 through 1B-10) is used for $K_1$ and $K_2$. The SRI reporting is according at least one of Alt 4F-0 and Alt 4F-1. The rest of the details about SRI indication is the same as in embodiment 4F.

In one embodiment 4J, when the number of Tx chains (or antenna ports) at the UE is 4, then the UE is configured with two types of SRS resources (either in one SRS resource set or in two different SRS resource sets):
- Type 1 (non-virtualized or non-precoded): comprises $K_1$ SRS resources with $N_1=4$ SRS ports, where $K_1 \geq 0$
- Type 2 (virtualized or precoded): comprises $K_2$ SRS resources with $N_2=1$ SRS port, where $K_2 \geq 0$.

At least one of $K_1$ and $K_2$ is greater than 1, i.e., $K_1=K_2=0$ is not possible. The UE transmits Type 1 and/or 2 SRS resources (with or without virtualization as explained in embodiment 1). The gNB measures these SRS resources, and indicates SRI to the UE. When the SRI indicates a Type 1 SRS resource, then TPMI corresponding to rank 1 or 2 or 3 or 4 transmission is also indicated. When the SRI indicates Type 2 SRS, then there is no TPMI indication, and the SRI either selects a single SRS resource indicating a port for rank 1 transmission or two SRS resources indicating two ports for rank 2 transmission (assuming identity precoding, i.e., 1 layer per port) or three SRS resources indicating three ports for rank 3 transmission (assuming identity precoding, i.e., 1 layer per port). At least one of the examples (4B-0 through 4B-10) is used for $K_1$ and $K_2$. The SRI reporting is according at least one of the following alternatives.

In one alternative Alt 4J-0: a joint SRI is used to select either (a) a type 1 SRS resource, or (b) a single Type 2 SRS resource or (c) two Type 2 SRS resources or (d) three Type 2 SRS resources. In one example, this requires a $$\left\lceil \log_2\left(K_1 + K_2 + \binom{K_2}{2} + \binom{K_2}{3}\right) \right\rceil \text{-bit}$$

indication.

In one alternative Alt 4J-1: two separate SRIs, (SRI1, SRI2), are used, where SRI1 is used to select one of the two types of SRS resources, and SRI2 is used to indicate SRS resource(s) within the selected type of SRS resources. In one example, SRI1 requires a 1-bit indication, and SRI2 requires a $\lceil \log_2 K_1 \rceil$-bit indication if SRI1 indicates Type 1 SRS resources, and a $$\left\lceil \log_2\left(K_2 + \binom{K_2}{2} + \binom{K_2}{3}\right) \right\rceil \text{-bit}$$

indication if SRI1 indicates Type 2 SRS resources.

The rest of the details about SRI indication is the same as in embodiment 4C.

In one embodiment 4K, when the number of Tx chains (or antenna ports) at the UE is 4, then the UE is configured with two types of SRS resources (either in one SRS resource set or in two different SRS resource sets):

Type 1 (non-virtualized or non-precoded): comprises $K_1$ SRS resources with $N_1=4$ SRS ports, where $K_1 \geq 0$ Type 2 (virtualized or precoded): comprises $K_2$ SRS resources with $N_2=1$ SRS port, where $K_2 \geq 0$.

At least one of $K_1$ and $K_2$ is greater than 1, i.e., $K_1=K_2=0$ is not possible. The UE transmits Type 1 and/or 2 SRS resources (with or without virtualization as explained in embodiment 1). The gNB measures these SRS resources, and indicates SRI to the UE. When the SRI indicates a Type 1 SRS resource, then TPMI corresponding to rank 1 or 2 or 3 or 4 transmission is also indicated.

When the SRI indicates a single Type 2 SRS resource, then there is no TPMI indication, and the single SRS resource indicates a port for rank 1 transmission.

When the SRI indicates two Type 2 SRS resources, then there is TPMI indication, and two SRS resources indicates two ports for at least one of the following transmission ranks (i) rank 1 only transmission (via rank 1 TPMIs), (ii) rank 2 only transmission (via rank 2 TPMIs), (iii) for rank 1 or 2 transmission (via rank 1-2 TPMIs).

When the SRI indicates three Type 2 SRS resources, then there is TPMI indication, and three SRS resources indicates three ports for at least one of the following transmission ranks (i) rank 1 only transmission (via rank 1 TPMIs), (ii) rank 2 only transmission (via rank 2 TPMIs), (iii) rank 3 only transmission (via rank 3 TPMIs) or (iv) for rank 1 or 2 or 3 transmission (via rank 1-3 TPMIs).

The rest of the details about SRI indication is the same as in embodiment 4D.

In one embodiment 4L, when the number of Tx chains (or antenna ports) at the UE is 4, then the UE is configured with two types of SRS resources (either in one SRS resource set or in two different SRS resource sets):

Type 1 (non-virtualized or non-precoded): comprises $K_1$ SRS resources with $N_1=4$ SRS ports, where $K_1 \geq 0$ Type 2 (virtualized or precoded): comprises $K_2$ SRS resources with $N_2=1$ SRS port, where $K_2 \geq 0$.

At least one of $K_1$ and $K_2$ is greater than 1, i.e., $K_1=K_2=0$ is not possible. The UE transmits Type 1 and/or 2 SRS resources (with or without virtualization as explained in embodiment 1). The gNB measures these SRS resources, and indicates SRI to the UE. When the SRI indicates a Type 1 SRS resource, then TPMI corresponding to rank 1 or 2 or 3 or 4 transmission is also indicated.

When the SRI indicates a single Type 2 SRS resource, then there is no TPMI indication, and the single SRS resource indicates a port for rank 1 transmission.

When the SRI indicates two Type 2 SRS resources, then either (a) there is TPMI indication (indicating identity precoding), and two SRS resources indicates two ports for rank 2 transmission (assuming identity precoding, i.e., 1 layer per port) or (b) there is TPMI indication (indicating non-identity precoding), and two SRS resources indicates two ports for at least one of the following transmission ranks (i) rank 1 only transmission (via rank 1 TPMIs), (ii) rank 2 only transmission (via rank 2 TPMIs), (iii) for rank 1 or 2 transmission (via rank 1-2 TPMIs).

When the SRI indicates three Type 2 SRS resources, then either (a) there is TPMI indication (indicating identity precoding), and three SRS resources indicates three ports for rank 2 transmission (assuming identity precoding, i.e., 1 layer per port) or (b) there is TPMI indication (indicating non-identity precoding), and three SRS resources indicates three ports for at least one of the following transmission ranks (i) rank 1 only transmission (via rank 1 TPMIs), (ii) rank 2 only transmission (via rank 2 TPMIs), (iii) rank 3 only transmission (via rank 3 TPMIs) or (iv) for rank 1 or 2 or 3 transmission (via rank 1-3 TPMIs).

The rest of the details about SRI indication is the same as in embodiment 4F.

In one embodiment 4M, when the number of Tx chains (or antenna ports) at the UE is 4, then the UE is configured with two types of SRS resources (either in one SRS resource set or in two different SRS resource sets):

Type 1 (non-virtualized or non-precoded): comprises $K_1$ SRS resources with $N_1=4$ SRS ports, where $K_1 \geq 0$ Type 2 (virtualized or precoded): comprises $K_2$ SRS resources, where $K_2=K_{21}+K_{22}$, divided into sub-types Type 2a: $K_{21}$ SRS resources with $N_2=1$ SRS port.

Type 2b: $K_{22}$ SRS resources with $N_2=2$ SRS ports.

At least one of $K_1$, $K_{21}$, and $K_{22}$ is greater than 1, i.e., $K_1=K_{21}=K_{22}=0$ is not possible. The UE transmits Type 1 and/or 2 SRS resources (with or without virtualization as explained in embodiment 1). The gNB measures these SRS resources, and indicates SRI to the UE.

When the SRI indicates a Type 1 SRS resource, then TPMI corresponding to rank 1 or 2 or 3 or 4 transmission is also indicated.

When the SRI indicates Type 2a SRS, then there is no TPMI indication, and the SRI selects a single SRS resource indicating a port for rank 1 transmission.

When the SRI indicates Type 2b SRS, the SRI selects two SRS resources indicating two ports for rank 2 transmission. At least one of the following alternatives is used for TPMI in this case.

In one alternative, there is no TPMI indication for rank 2 transmission. In this alternative, the UE assumes a fixed precoding matrix, e.g., identity precoding matrix.

In one alternative, there is TPMI indication for rank 2 transmission.

Note that for Type 2 SRS resources, rank=number of SRS ports in the selected SRS resource. The SRI reporting is according to at least one of the following alternatives.

In one alternative Alt 4M-0: a joint SRI is used to select (a) one of the two types of SRS resources, and (b) a SRS resource within the selected type of SRS resources. In one example, this requires a $\lceil \log_2 (K_1+K_2) \rceil$-bit indication.

In one alternative Alt 4M-1: two separate SRIs, (SRI1, SRI2), are used, where SRI1 is used to select one of the two types of SRS resources, and SRI2 is used to indicate a SRS resource within the selected type of SRS resources. In one example, SRI1 requires a 1-bit indication, and SRI2 requires a $\lceil \log_2 K_1 \rceil$-bit indication if SRI1 indicates Type 1 SRS resources, and a $\lceil \log_2 K_2 \rceil$-bit indication if SRI1 indicates Type 2 SRS resources.

In one alternative Alt 4M-2: two separate SRIs, (SRI1, SRI2), are used, where SRI1 is used to select one of the two types/sub-types of SRS resources, and SRI2 is used to indicate a SRS resource within the selected type/sub-type of SRS resources. In one example, SRI1 requires a 2-bit indication, and SRI2 requires a $\lceil \log_2 K_1 \rceil$-bit indication if SRI1 indicates Type 1 SRS resources, a $\lceil \log_2 K_{21} \rceil$-bit indication if SRI1 indicates Type 2a SRS resources and a $\lceil \log_2 K_{22} \rceil$-bit indication if SRI1 indicates Type 2b SRS resources.

The rest of the details about SRI indication is the same as in embodiment 4C.

In one embodiment 4N, when the number of Tx chains (or antenna ports) at the UE is 4, then the UE is configured with two types of SRS resources (either in one SRS resource set or in two different SRS resource sets):

Type 1 (non-virtualized or non-precoded): comprises $K_1$ SRS resources with $N_1=4$ SRS ports, where $K_1 \geq 0$ Type 2 (virtualized or precoded): comprises $K_2$ SRS resources, where $K_2=K_{21}+K_{22}+K_{23}$, divided into sub-types Type 2a: $K_{21}$ SRS resources with $N_2=1$ SRS port.
Type 2b: $K_{22}$ SRS resources with $N_2=2$ SRS ports.
Type 2c: $K_{23}$ SRS resources with $N_2=3$ SRS ports.

At least one of $K_1$, $K_{21}$, $K_{22}$ and $K_{23}$ is greater than 1, i.e., $K_1=K_{21}=K_{22}=K_{23}=0$ is not possible. The UE transmits Type 1 and/or 2 SRS resources (with or without virtualization as explained in embodiment 1). The gNB measures these SRS resources, and indicates SRI to the UE.

When the SRI indicates a Type 1 SRS resource, then TPMI corresponding to rank 1 or 2 or 3 or 4 transmission is also indicated.

When the SRI indicates Type 2a SRS, then there is no TPMI indication, and the SRI selects a single SRS resource indicating a port for rank 1 transmission.

When the SRI indicates Type 2b SRS, the SRI selects two SRS resources indicating two ports for rank 2 transmission. At least one of the following alternatives is used for TPMI in this case.

In one alternative, there is no TPMI indication for rank 2 transmission. In this alternative, the UE assumes a fixed precoding matrix, e.g., identity precoding matrix.

In one alternative, there is TPMI indication for rank 2 transmission.

When the SRI indicates Type 2c SRS, the SRI selects three SRS resources indicating three ports for rank 3 transmission. At least one of the following alternatives is used for TPMI in this case.

In one alternative, there is no TPMI indication for rank 3 transmission. In this alternative, the UE assumes a fixed precoding matrix, e.g., identity precoding matrix.

In one alternative, there is TPMI indication for rank 3 transmission.

For Type 2 SRS resources, rank=number of SRS ports in the selected SRS resource. The SRI reporting is according to at least one of the following alternatives.

In one alternative Alt 4M-0: a joint SRI is used to select (a) one of the two types of SRS resources, and (b) a SRS resource within the selected type of SRS resources. In one example, this requires a $\lceil \log_2(K_1+K_2) \rceil$-bit indication.

In one alternative Alt 4M-1: two separate SRIs, (SRI1, SRI2), are used, where SRI1 is used to select one of the two types of SRS resources, and SRI2 is used to indicate a SRS resource within the selected type of SRS resources. In one example, SRI1 requires a 1-bit indication, and SRI2 requires a $\lceil \log_2 K_1 \rceil$-bit indication if SRI1 indicates Type 1 SRS resources, and a $\lceil \log_2 K_2 \rceil$-bit indication if SRI1 indicates Type 2 SRS resources.

In one alternative Alt 4M-2: two separate SRIs, (SRI1, SRI2), are used, where SRI1 is used to select one of the two types/sub-types of SRS resources, and SRI2 is used to indicate a SRS resource within the selected type/sub-type of SRS resources. In one example, SRI1 requires a 2-bit indication, and SRI2 requires a $\lceil \log_2 K_1 \rceil$-bit indication if SRI1 indicates Type 1 SRS resources, a $\lceil \log_2 K_{21} \rceil$-bit indication if SRI1 indicates Type 2a SRS resources, a $\lceil \log_2 K_{22} \rceil$-bit indication if SRI1 indicates Type 2b SRS resources, and a $\lceil \log_2 K_{23} \rceil$-bit indication if SRI1 indicates Type 2c SRS resources.

The rest of the details about SRI indication is the same as in embodiment 4C.

In a variation of this embodiment, Type 1 SRS resources can also be virtualized or precoded. Likewise, Type 2 SRS resources can also be non-virtualized or non-precoded.

In one example, the full power UL transmission according to some embodiments of this disclosure is referred to as Mode 2. The UE reports via its capability signaling whether it can support full power UL transmission according to Mode 2. If the UE is capable to support full power UL transmission according to Mode 2, then the gNB or network (NW) can configure the full power UL transmission to the UE via higher layer signaling of parameter ulFPTx or ulFPTxModes set to Mode2.

In one embodiment 5, when the UE is configured with codebook-based UL transmission (e.g., via higher layer parameter txConfig=codebook) and also configured with full power UL transmission according to some embodiments of this disclosure (e.g., via higher layer parameter ulFPTx or ulFPTxModes=Mode2), the indication/configuration of SRI (indicating one out of multiple SRS resources) and TRI/TPMI (e.g., via parameter Precoding information and number of layers) is according to at least one of the following alternatives.

In one alternative Alt 5-1, when the UE is configured with multiple SRS resources (Type 1 and/or 2), then SRI is indicated/configured via higher layer signaling, and TRI/TPMI is indicated/configured via DCI (e.g., NR DCI format 0_1). Note that the TRI/TPMI size (number of bit or payload) depends on the number of SRS ports associated with the indicated SRS resource. For instance, the payload for a 4-port SRS resource is larger than that for a 2-port SRS resource. However, since SRI is indicated via higher layer signaling, the TRI/TPMI size in DCI is fixed once the UE receives the RRC configuration.

In one alternative Alt 5-1A, when the UE is configured with multiple SRS resources (Type 1 and/or 2), then the number of SRS ports (X) associated with the SRS resource (indicated via SRI in DCI) is indicated/configured via higher layer signaling, and both SRI and TRI/TPMI are indicated/configured via DCI (e.g., NR DCI format 0_1). The SRI is indicated via DCI only if there are multiple SRS resources with X number of SRS ports.

In one alternative Alt 5-2, when the UE is configured with multiple SRS resources (Type 1 and/or 2), then SRI is indicated/configured via MAC CE based signaling, and TRI/TPMI is indicated/configured via DCI (e.g., NR DCI format 0_1). Note that the TRI/TPMI size (number of bit or payload) depends on the number of SRS ports associated with the indicated SRS resource. For instance, the payload for a 4-port SRS resource is larger than that for a 2-port SRS resource. However, since SRI is indicated via MAC CE based signaling, the TRI/TPMI size in DCI is fixed once the UE receives the MAC CE signaling.

In one alternative Alt 5-2A, when the UE is configured with multiple SRS resources (Type 1 and/or 2), then the number of SRS ports (X) associated with the SRS resource (indicated via SRI in DCI) is indicated/configured via MAC CE based signaling, and both SRI and TRI/TPMI are indicated/configured via DCI (e.g., NR DCI format 0_1). The SRI is indicated via DCI only if there are multiple SRS resources with X number of SRS ports.

In one alternative Alt 5-3, when the UE is configured with multiple SRS resources (Type 1 and/or 2), then both SRI and TRI/TPMI are indicated/configured via DCI (e.g., NR DCI format 0_1). Since TRI/TPMI size (number of bit or payload) can vary depending on the number of SRS ports associated with the multiple SRS resources, the DCI payload may be ambiguous. To avoid this ambiguity, the TRI/TPMI size can be fixed to the maximum (or largest) TRI/TPMI size, where the maximum is across all SRS resources. In one example, this maximum corresponds to the SRS resource with the maximum number of SRS ports.

In one alternative Alt 5-4, when the UE is configured with multiple SRS resources (Type 1 and/or 2), then both SRI and TRI/TPMI are indicated/configured jointly via a single filed in DCI (e.g., NR DCI format 0_1).

In one alternative Alt 5-5, when the UE is configured with multiple SRS resources (Type 1 and/or 2) with the same number of SRS ports, then the SRI is indicated/configured via DCI (e.g., via NR DCI format 0_1). When the UE is configured with multiple SRS resources with at least two SRS resources with different number of SRS ports, then the SRI is indicated/configured via higher layer (e.g., RRC) signaling, or alternatively, via MAC CE based signaling. The TRI/TPMI indication is via DCI.

In one embodiment 6, the UE is always configured with $K=K_1+K_2 \geq 2$ SRS resources for full power UL transmission according to some embodiments of this disclosure, where either (a) $K_1 \geq 1$ and $K_2 \geq 1$ or (b) $K_1=0$, $K_2 \geq 2$ and there are at least 2 (Type 2) SRS resources with different number of SRS ports. In one example, K E $\{2,4\}$. In one example, K=2 for 2 antenna ports at the UE and K E $\{2,4\}$ for 4 antenna ports at the UE. Note that there needs to be at least two SRS resources (out of the K SRS resources) with different number of SRS ports. The number of SRS ports in each of the K SRS resources is according to at least one of the following alternatives.

In one alternative Alt 6-1, the number of SRS ports in each of the K SRS resources belongs to $\{1,2,3,4\}$. In particular, for 2 antenna ports at the UE, the number of SRS ports in each of the K SRS resources belongs to $\{1,2\}$, and for 4 antenna ports at the UE, the number of SRS ports in each of the K SRS resources belongs to $\{1,2,3,4\}$.

An example of all possible SRS resource combinations for 2 antenna ports at the UE and K=2 is shown in Table 44.

An example of all possible SRS resource combinations for 2 antenna ports at the UE and K=3 is shown in Table 45. In one example, the UE can be configured with any of the SRS resource combinations from Table 45. In another example, the UE can only be configured with a fixed SRS resource combination. An example of the fixed SRS resource combination is SRS resource combination index=0.

An example of all possible SRS resource combinations for 2 antenna ports at the UE and K=4 is shown in Table 46. In one example, the UE can be configured with any of the SRS resource combinations from Table 46. In another example, the UE can only be configured with a fixed SRS resource combination. An example of the fixed SRS resource combination is SRS resource combination index=0.

In another example, the UE can only be configured with a SRS resource combination from a subset of the all SRS resource combination in Table 46. In one example, this subset corresponds to SRS resource combination indices 0-1.

TABLE 44

SRS resource combinations for 2 antenna ports and K = 2

| SRS resource combination index | Number of 1-port SRS resource(s) | Number of 2-port SRS resource(s) |
|---|---|---|
| 0 | 1 | 1 |

TABLE 45

SRS resource combinations for 2 antenna ports and K = 3

| SRS resource combination index | Number of 1-port SRS resource(s) | Number of 2-port SRS resource(s) |
|---|---|---|
| 0 | 2 | 1 |
| 1 | 1 | 2 |

TABLE 46

SRS resource combinations for 2 antenna ports and K = 4

| SRS resource combination index | Number of 1-port SRS resource(s) | Number of 2-port SRS resource(s) |
|---|---|---|
| 0 | 3 | 1 |
| 1 | 2 | 2 |
| 2 | 1 | 3 |

An example of all possible SRS resource combinations for 4 antenna ports at the UE and K=2 is shown in Table 47. In one example, the UE can be configured with any of the SRS resource combinations from Table 47. In another example, the UE can only be configured with a fixed SRS resource combination. An example of the fixed SRS resource combination is SRS resource combination index=2. In another example, the UE can only be configured with a SRS resource combination from a subset of the all SRS resource combination in Table 47. In one example, this subset corresponds to SRS resource combination indices 0-2.

TABLE 47

SRS resource combinations for 4 antenna ports and K = 2

| SRS resource combination index | Number of 1-port SRS resource(s) | Number of 2-port SRS resource(s) | Number of 3-port SRS resource(s) | Number of 4-port SRS resource(s) |
|---|---|---|---|---|
| 0 | 1 | 1 | 0 | 0 |
| 1 | 1 | 0 | 1 | 0 |
| 2 | 1 | 0 | 0 | 1 |
| 3 | 0 | 1 | 1 | 0 |
| 4 | 0 | 1 | 0 | 1 |
| 5 | 0 | 0 | 1 | 1 |

An example of all possible SRS resource combinations for 4 antenna ports at the UE and K=3 is shown in Table 48. In one example, the UE can be configured with any of the SRS resource combinations from Table 48. In another example, the UE can only be configured with a fixed SRS resource combination. An example of the fixed SRS resource combination is SRS resource combination index=1. In another example, the UE can only be configured with a SRS resource combination from a subset of the all SRS resource combination in Table 48. In one example, this subset corresponds to SRS resource combination indices 0-3.

TABLE 48

SRS resource combinations for 4 antenna ports and K = 3

| SRS resource combination index | Number of 1-port SRS resource(s) | Number of 2-port SRS resource(s) | Number of 3-port SRS resource(s) | Number of 4-port SRS resource(s) |
|---|---|---|---|---|
| 0  | 1 | 1 | 1 | 0 |
| 1  | 1 | 1 | 0 | 1 |
| 2  | 1 | 0 | 1 | 1 |
| 3  | 0 | 1 | 1 | 1 |
| 4  | 2 | 1 | 0 | 0 |
| 5  | 2 | 0 | 1 | 0 |
| 6  | 2 | 0 | 0 | 1 |
| 7  | 1 | 2 | 0 | 0 |
| 8  | 0 | 2 | 1 | 0 |
| 9  | 0 | 2 | 0 | 1 |
| 10 | 1 | 0 | 2 | 0 |
| 11 | 0 | 1 | 2 | 0 |
| 12 | 0 | 0 | 2 | 1 |
| 13 | 1 | 0 | 0 | 2 |
| 14 | 0 | 1 | 0 | 2 |
| 15 | 0 | 0 | 1 | 2 |

An example of all possible SRS resource combinations for 4 antenna ports at the UE and K=4 is shown in Table 49. In one example, the UE can be configured with any of the SRS resource combinations from Table 49. In another example, the UE can only be configured with a fixed SRS resource combination. An example of the fixed SRS resource combination is SRS resource combination index=0. In another example, the UE can only be configured with a SRS resource combination from a subset of the all SRS resource combination in Table 49. In one example, this subset corresponds to SRS resource combination indices 0-12.

TABLE 49

SRS resource combinations for 4 antenna ports and K = 4

| SRS resource combination index | Number of 1-port SRS resource(s) | Number of 2-port SRS resource(s) | Number of 3-port SRS resource(s) | Number of 4-port SRS resource(s) |
|---|---|---|---|---|
| 0  | 1 | 1 | 1 | 1 |
| 1  | 2 | 1 | 1 | 0 |
| 2  | 2 | 1 | 0 | 1 |
| 3  | 2 | 0 | 1 | 1 |
| 4  | 1 | 2 | 1 | 0 |
| 5  | 1 | 2 | 0 | 1 |
| 6  | 0 | 2 | 1 | 1 |
| 7  | 1 | 1 | 2 | 0 |
| 8  | 1 | 0 | 2 | 1 |
| 9  | 0 | 1 | 2 | 1 |
| 10 | 1 | 1 | 0 | 2 |
| 11 | 1 | 0 | 1 | 2 |
| 12 | 0 | 1 | 1 | 2 |
| 13 | 3 | 1 | 0 | 0 |
| 14 | 3 | 0 | 1 | 0 |
| 15 | 3 | 0 | 0 | 1 |
| 16 | 1 | 3 | 0 | 0 |
| 17 | 0 | 3 | 1 | 0 |
| 18 | 0 | 3 | 0 | 1 |
| 19 | 1 | 0 | 3 | 0 |
| 20 | 0 | 1 | 3 | 0 |
| 21 | 0 | 0 | 3 | 1 |
| 22 | 1 | 0 | 0 | 3 |

TABLE 49-continued

SRS resource combinations for 4 antenna ports and K = 4

| SRS resource combination index | Number of 1-port SRS resource(s) | Number of 2-port SRS resource(s) | Number of 3-port SRS resource(s) | Number of 4-port SRS resource(s) |
|---|---|---|---|---|
| 23 | 0 | 1 | 0 | 3 |
| 24 | 0 | 0 | 1 | 3 |
| 25 | 2 | 2 | 0 | 0 |
| 26 | 2 | 0 | 2 | 0 |
| 27 | 2 | 0 | 0 | 2 |
| 28 | 0 | 2 | 2 | 0 |
| 29 | 0 | 2 | 0 | 2 |
| 30 | 0 | 0 | 2 | 2 |

In one alternative Alt 6-2, the number of SRS ports in each of the K SRS resources belongs to {1,2,4}. In particular, for 2 antenna ports at the UE, the number of SRS ports in each of the K SRS resources belongs to {1,2}, and for 4 antenna ports at the UE, the number of SRS ports in each of the K SRS resources belongs to {1,2,4}.

An example of all possible SRS resource combinations for 4 antenna ports at the UE and K=2 is shown in Table 50. In one example, the UE can be configured with any of the SRS resource combinations from Table 50. In another example, the UE can only be configured with a fixed SRS resource combination. An example of the fixed SRS resource combination is SRS resource combination index=1. In another example, the UE can only be configured with a SRS resource combination from a subset of the all SRS resource combination in Table 50. In one example, this subset corresponds to SRS resource combination indices 0-1.

TABLE 50

SRS resource combinations for 4 antenna ports and K = 2

| SRS resource combination index | Number of 1-port SRS resource(s) | Number of 2-port SRS resource(s) | Number of 4-port SRS resource(s) |
|---|---|---|---|
| 0 | 1 | 1 | 0 |
| 1 | 1 | 0 | 1 |
| 2 | 0 | 1 | 1 |

An example of all possible SRS resource combinations for 4 antenna ports at the UE and K=3 is shown in Table 51. In one example, the UE can be configured with any of the SRS resource combinations from Table 51. In another example, the UE can only be configured with a fixed SRS resource combination. An example of the fixed SRS resource combination is SRS resource combination index=0. In another example, the UE can only be configured with a SRS resource combination from a subset of the all SRS resource combination in Table 51. In one example, this subset corresponds to SRS resource combination indices 0-1.

TABLE 51

SRS resource combinations for 4 antenna ports and K = 3

| SRS resource combination index | Number of 1-port SRS resource(s) | Number of 2-port SRS resource(s) | Number of 4-port SRS resource(s) |
|---|---|---|---|
| 0 | 1 | 1 | 1 |
| 1 | 2 | 1 | 0 |
| 2 | 2 | 0 | 1 |
| 3 | 1 | 2 | 0 |

TABLE 51-continued

SRS resource combinations for 4 antenna ports and K = 3

| SRS resource combination index | Number of 1-port SRS resource(s) | Number of 2-port SRS resource(s) | Number of 4-port SRS resource(s) |
|---|---|---|---|
| 4 | 0 | 2 | 1 |
| 5 | 1 | 0 | 2 |
| 6 | 0 | 1 | 2 |

An example of all possible SRS resource combinations for 4 antenna ports at the UE and K=4 is shown in Table 52. In one example, the UE can be configured with any of the SRS resource combinations from Table 52. In another example, the UE can only be configured with a fixed SRS resource combination. An example of the fixed SRS resource combination is SRS resource combination index=0. In another example, the UE can only be configured with a SRS resource combination from a subset of the all SRS resource combination in Table 52. In one example, this subset corresponds to SRS resource combination indices 0-2.

TABLE 52

SRS resource combinations for 4 antenna ports and K = 4

| SRS resource combination index | Number of 1-port SRS resource(s) | Number of 2-port SRS resource(s) | Number of 4-port SRS resource(s) |
|---|---|---|---|
| 0 | 2 | 1 | 1 |
| 1 | 1 | 2 | 1 |
| 2 | 1 | 1 | 2 |
| 3 | 3 | 1 | 0 |
| 4 | 3 | 0 | 1 |
| 5 | 1 | 3 | 0 |
| 6 | 0 | 3 | 1 |
| 7 | 1 | 0 | 3 |
| 8 | 0 | 1 | 3 |
| 9 | 2 | 2 | 0 |
| 10 | 2 | 0 | 2 |
| 11 | 0 | 2 | 2 |

In one embodiment 7, when the UE is configured with codebook-based UL transmission (e.g., via higher layer parameter txConfig=codebook) and also configured with full power UL transmission according to some embodiments of this disclosure (e.g., via higher layer parameter ulFPTx or ulFPTxModes=Mode2), the UE can be configured with multiple SRS resources with different number of SRS ports. If there are four antenna ports at the UE, then the UE can be configured with multiple SRS resources with number of SRS ports belonging to {1,2,4} or {1,2,3,4}, as proposed in some embodiments on this disclosure. For a UE reporting its UE capability of 'partialAndNonCoherent' transmission, when configured with at least 2 (≥2) SRS resources with one SRS resource with 4 SRS ports, and another SRS resource with 2 SRS ports, then the codebook for TRI/TPMI indication (via DCI) is according to at least one of the following alternatives.

In one alternative Alt 7-1, when the UE is configured with higher layer parameter codebookSubset='partialAndNonCoherent'
- when the SRI (indicated via DCI) indicates the SRS resource with 4 SRS ports, then the UE uses 4Tx UL codebook (can be obtained using Table 2, Table 4, Table 5, Table 6, and Table 8) for 'partialAndNonCoherent' for TRI/TPMI indication.
- when the SRI (indicated via DCI) indicates the SRS resource with 2 SRS ports, then at least one of the following alternatives is used.
  - In one alternative Alt 7-1-1: UE uses 2Tx UL codebook (can be obtained using Table 1, Table 3, and Table 7) for 'partialAndNonCoherent' for TRI/TPMI indication.
  - In one alternative Alt 7-1-2: UE uses 2Tx UL codebook (can be obtained using Table 1, Table 3, and Table 7) for 'nonCoherent' for TRI/TPMI indication.
  - In one alternative Alt 7-1-3: UE uses 2Tx UL codebook (can be obtained using Table 1, Table 3, and Table 7) for 'nonCoherent' or 'partialAndNonCoherent' for TRI/TPMI indication. At least one of the following sub-alternatives is used.
    - In one alternative Alt 7-1-3-1: Whether the 2Tx codebook is 'nonCoherent' or 'partialAndNonCoherent' can be configured via higher layer (RRC) signaling either via a separate parameter or together with other parameter(s).
    - In one alternative Alt 7-1-3-2: Whether the 2Tx codebook is 'nonCoherent' or 'partialAndNonCoherent' can be subject to UE capability, i.e., the UE reports it via its capability signaling either via a separate filed or together with other field(s). If the UE reports only one of 'nonCoherent' or 'partialAndNonCoherent', then the codebook reported by the UE is used. Or, if the UE reports both 'nonCoherent' and 'partialAndNonCoherent', then one of the two codebook is configured via higher layer (RRC) signaling either via a separate parameter or together with other parameter(s).

In one alternative Alt 7-2, when the UE is configured with higher layer parameter codebookSubset='nonCoherent'
- when the SRI (indicated via DCI) indicates the SRS resource with 4 SRS ports, then the UE uses 4Tx UL codebook (can be obtained using Table 2, Table 4, Table 5, Table 6, and Table 8) for 'nonCoherent' for TRI/TPMI indication.
- when the SRI (indicated via DCI) indicates the SRS resource with 2 SRS ports, then at least one of the following alternatives is used.
  - Alt 7-2-1: UE uses 2Tx UL codebook (can be obtained using Table 1, Table 3, and Table 7) for 'partialAndNonCoherent' for TRI/TPMI indication.
  - Alt 7-2-2: UE uses 2Tx UL codebook (can be obtained using Table 1, Table 3, and Table 7) for 'nonCoherent' for TRI/TPMI indication.
  - Alt 7-2-3: UE uses 2Tx UL codebook (can be obtained using Table 1, Table 3, and Table 7) for 'nonCoherent' or 'partialAndNonCoherent' for TRI/TPMI indication. At least one of the following sub-alternatives is used.
    - Alt 7-2-3-1: Whether the 2Tx codebook is 'nonCoherent' or 'partialAndNonCoherent' can be configured via higher layer (RRC) signaling either via a separate parameter or together with other parameter(s).
    - Alt 7-2-3-2: Whether the 2Tx codebook is 'nonCoherent' or 'partialAndNonCoherent' can be subject to UE capability, i.e., the UE reports it via its capability signaling either via a separate filed or together with other field(s). If the UE reports only one of 'nonCoherent' or 'partialAndNonCoherent', then the codebook reported by the UE is used. Or, if the UE reports both 'nonCoherent' and 'partialAndNonCoherent', then one of the two codebook is configured via higher layer (RRC) signaling either via a separate parameter or together with other parameter(s).

In one alternative Alt 7-3, regardless of whether the UE is configured with higher layer parameter codebookSubset='nonCoherent' or 'partialAndNonCoherent'
- when the SRI (indicated via DCI) indicates the SRS resource with 4 SRS ports, then the UE uses 4Tx UL codebook (can be obtained using Table 2, Table 4, Table 5, Table 6, and Table 8) for 'nonCoherent' or 'partialAndNonCoherent' (according to the configuration) for TRI/TPMI indication.
- when the SRI (indicated via DCI) indicates the SRS resource with 2 SRS ports, then at least one of the following alternatives is used.

In one alternative Alt 7-3-1: UE uses 2Tx UL codebook (can be obtained using Table 1, Table 3, and Table 7) for 'partialAndNonCoherent' for TRI/TPMI indication.

In one alternative Alt 7-3-2: UE uses 2Tx UL codebook (can be obtained using Table 1, Table 3, and Table 7) for 'nonCoherent' for TRI/TPMI indication.

In one alternative Alt 7-3-3: UE uses 2Tx UL codebook (can be obtained using Table 1, Table 3, and Table 7) for 'nonCoherent' or 'partialAndNonCoherent' for TRI/TPMI indication. At least one of the following sub-alternatives is used.

In one alternative Alt 7-3-3-1: Whether the 2Tx codebook is 'nonCoherent' or 'partialAndNonCoherent' can be configured via higher layer (RRC) signaling either via a separate parameter or together with other parameter(s).

In one alternative Alt 7-3-3-2: Whether the 2Tx codebook is 'nonCoherent' or 'partialAndNonCoherent' can be subject to UE capability, i.e., the UE reports it via its capability signaling either via a separate filed or together with other field(s). If the UE reports only one of 'nonCoherent' or 'partialAndNonCoherent', then the codebook reported by the UE is used. Or, if the UE reports both 'nonCoherent' and 'partialAndNonCoherent', then one of the two codebook is configured via higher layer (RRC) signaling either via a separate parameter or together with other parameter(s).

In one example, only one of Alt 7-1 through Alt 7-3 is fixed (supported). In another example, multiple of Alt 7-1 through Alt 7-3 is supported, and the one of the supported alternative is configured via higher layer (RRC) signaling.

In one example, only one of Alt 7-1-1 through Alt 7-1-3 is fixed (supported). In another example, multiple of Alt 4-1-1 through Alt 4-1-3 is supported, and the one of the supported alternative is configured via higher layer (RRC) signaling.

In one example, only one of Alt 7-2-1 through Alt 7-2-3 is fixed (supported). In another example, multiple of Alt 7-2-1 through Alt 7-2-3 is supported, and the one of the supported alternative is configured via higher layer (RRC) signaling.

In one example, only one of Alt 7-3-1 through Alt 7-3-3 is fixed (supported). In another example, multiple of Alt 7-3-1 through Alt 7-3-3 is supported, and the one of the supported alternative is configured via higher layer (RRC) signaling.

In one example, only one of Alt 7-1-3-1 through Alt 7-1-3-2 is fixed (supported). In another example, multiple of Alt 7-1-3-1 through Alt 7-1-3-2 is supported, and the one of the supported alternative is configured via higher layer (RRC) signaling.

In one example, only one of Alt 7-2-3-1 through Alt 7-2-3-2 is fixed (supported). In another example, multiple of Alt 7-2-3-1 through Alt 7-2-3-2 is supported, and the one of the supported alternative is configured via higher layer (RRC) signaling.

In one example, only one of Alt 7-3-3-1 through Alt 7-3-3-2 is fixed (supported). In another example, multiple of Alt 7-3-3-1 through Alt 7-3-3-2 is supported, and the one of the supported alternative is configured via higher layer (RRC) signaling.

Figure 14:
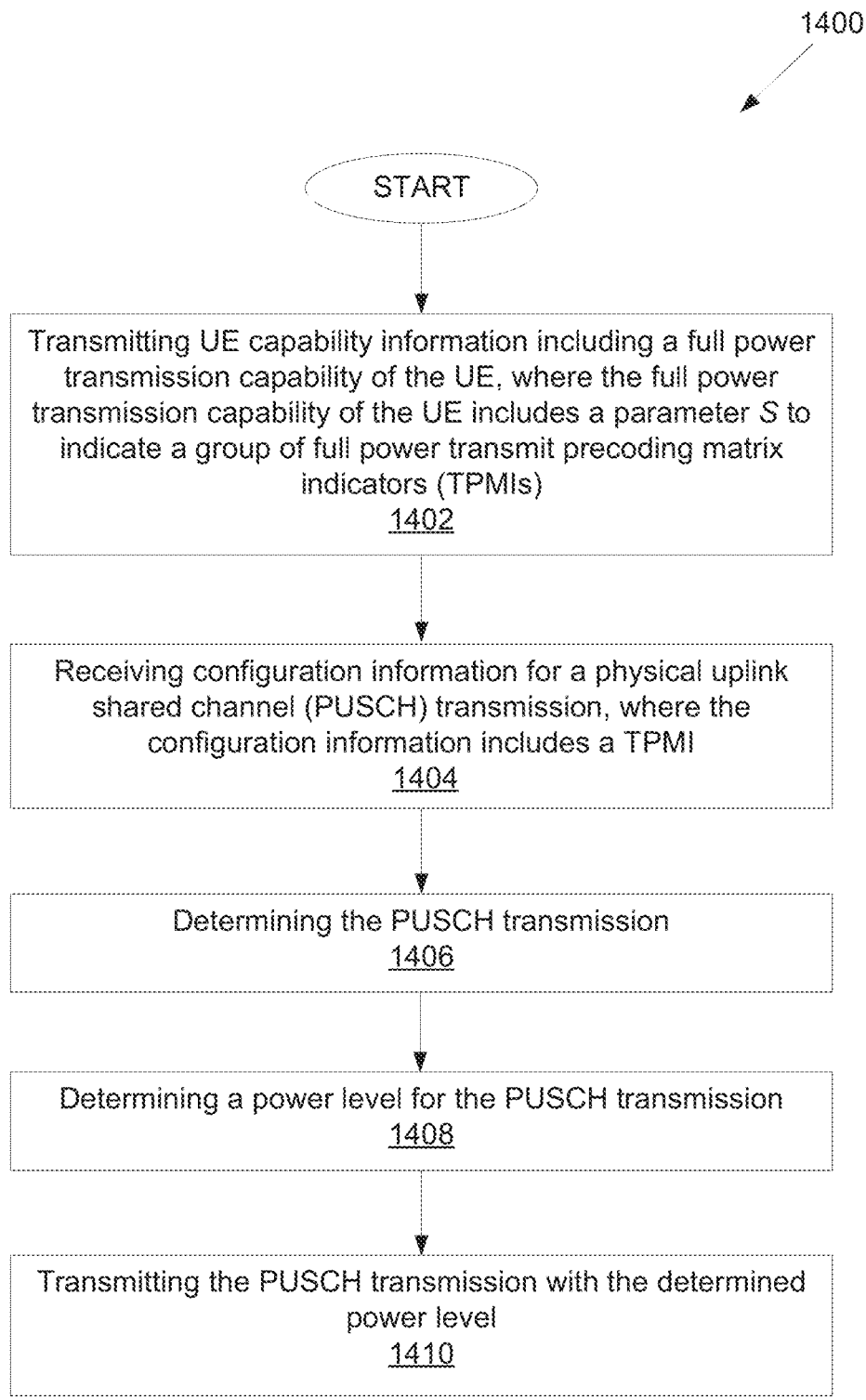
FIG. 14 illustrates a flow chart of a method for operating a user equipment (UE) according to embodiments of the present disclosure.

FIG. 14 illustrates a flow chart of a method 1400 for operating a user equipment (UE), as may be performed by a UE, according to embodiments of the present disclosure. The embodiment of the method 1400 illustrated in FIG. 14 is for illustration only. FIG. 14 does not limit the scope of this disclosure to any particular implementation.

As illustrates in FIG. 14, the method 1400 begins at step 1402. In step 1402, the UE (e.g., 111-116 as illustrated in FIG. 1) transmits, to a base station (BS), UE capability information including a full power transmission capability of the UE, wherein the full power transmission capability of the UE includes a parameter S to indicate a group of full power transmit precoding matrix indicators (TPMIs).

In step 1404, the UE receives, from the BS, configuration information for a physical uplink shared channel (PUSCH) transmission, where the configuration information includes a TPMI.

In step 1406, the UE determines the PUSCH transmission.

In step 1408, the UE determines a power level for the PUSCH transmission.

In step 1410, the UE transmits, to the BS, the PUSCH transmission with the determined power level, The power level corresponds to full power based on the TPMI being included in the group of full power TPMIs, and the TPMI indicates a precoding matrix and a number of layers for the PUSCH transmission.

In one embodiment, the UE receives a portion of the configuration information, which includes the TPMI, via downlink control information (DCI).

In one embodiment, the UE capability information includes coherence capability of antenna ports at the UE, where the coherence capability is one of non-coherent or partial-coherent, partial-coherent indicating that at most two antenna ports at the UE can be used to transmit a layer of the PUSCH transmission, and non-coherent indicating that only a single antenna port at the UE can be used to transmit a layer of the PUSCH transmission.

In one embodiment, when the UE has 2 antenna ports and the group of full power TPMIs corresponds to a non-coherent TPMI group, the parameter S indicates one of the TPMI groups G0 . . . G2 given by

| TPMI group | TPMI pre-coder/pre-coding matrices |
|---|---|
| G0 | $\frac{1}{\sqrt{2}}\begin{bmatrix}1\\0\end{bmatrix}$ |
| G1 | $\frac{1}{\sqrt{2}}\begin{bmatrix}0\\1\end{bmatrix}$ |
| G2 | $\frac{1}{\sqrt{2}}\begin{bmatrix}1\\0\end{bmatrix}, \frac{1}{\sqrt{2}}\begin{bmatrix}0\\1\end{bmatrix}.$ |

In one embodiment, when the UE has 4 antenna ports and the group of full power TPMIs corresponds to a non-coherent TPMI group, the parameter S indicates one of the TPMI groups G0 . . . G3 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}.$ |

In one embodiment, when the UE has 4 antenna ports and the group of full power TPMIs corresponds to a partial-coherent TPMI group, the parameter S indicates one of the TPMI groups G0 . . . G6 given by

| TPMI group | TPMI pre-coder/pre-coding matrices |
|---|---|
| G0 | $\frac{1}{2}\begin{bmatrix}1\\0\\0\\0\end{bmatrix}$ |

| TPMI group | TPMI pre-coder/pre-coding matrices |
| --- | --- |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G4 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}$ |
| G5 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G6 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix},$ $\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\1&0\\1&0\\0&1\end{bmatrix}, \frac{1}{2}\begin{bmatrix}1&0&0\\0&1&0\\0&0&1\\0&0&0\end{bmatrix}$ |

In one embodiment, when the UE has 4 antenna ports and the group of full power TPMIs corresponds to a partial-coherent TPMI group, the parameter S indicates one of the TPMI groups G0 . . . G14 given by

| TPMI group | TPMI pre-coder/pre-coding matrices |
| --- | --- |
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |

| TPMI group | TPMI pre-coder/pre-coding matrices |
|---|---|
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G4 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}$ |
| G5 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G6 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix},$ |
| | $\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\0&1\\0&1\end{bmatrix}, \frac{1}{2}\begin{bmatrix}1&0&0\\0&1&0\\0&0&1\\0&0&0\end{bmatrix}$ |
| G7 | union of groups {G0, G4} |
| G8 | union of groups {G0, G5} |
| G9 | union of groups {G0, G6} |
| G10 | union of groups {G1, G4} |
| G11 | union of groups {G1, G5} |
| G12 | union of groups {G1, G6} |
| G13 | union of groups {G2, G4} |
| G14 | union of groups {G2, G5}. |

Figure 15:
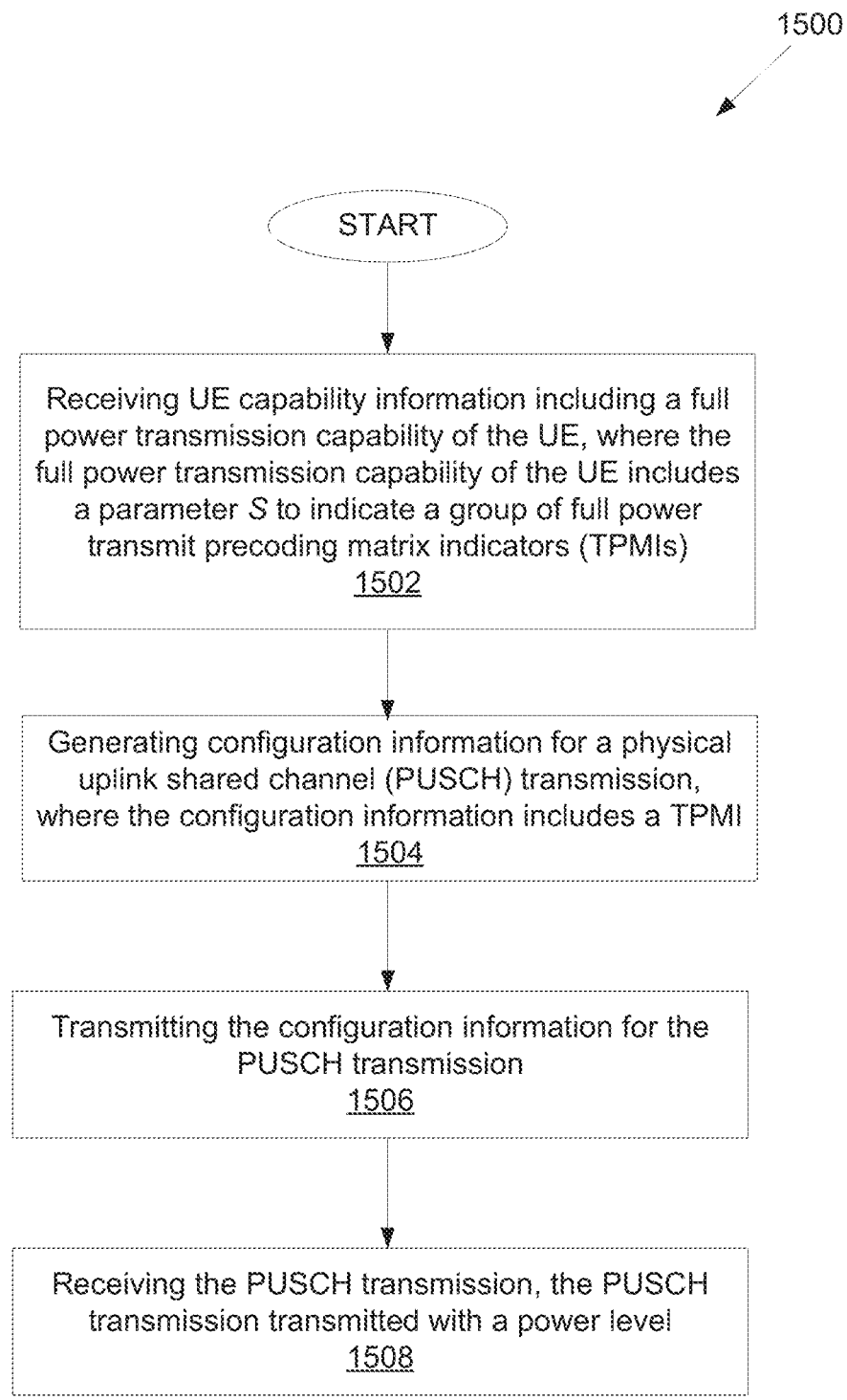
FIG. 15 illustrates a flow chart of another method for receiving an UL transmission, as may be performed by a base station (BS), according to embodiments of the present disclosure.

FIG. 15 illustrates a flow chart of another method 1500, as may be performed by a base station (BS), according to embodiments of the present disclosure. The embodiment of the method 1500 illustrated in FIG. 15 is for illustration only. FIG. 15 does not limit the scope of this disclosure to any particular implementation.

As illustrated in FIG. 15, the method 1500 begins at step 1502. In step 1502, the BS (e.g., 101-103 as illustrated in FIG. 1), receives, from a user equipment (UE), UE capability information including a full power transmission capability of the UE, wherein the full power transmission capability of the UE includes a parameter S to indicate a group of full power transmit precoding matrix indicators (TPMIs).

In step 1504, the BS generates configuration information for a physical uplink shared channel (PUSCH) transmission, wherein the configuration information includes a TPMI.

In step 1506, the BS transmits, to the UE, the configuration information for the PUSCH transmission.

In step 1508, the BS receives, from the UE, the PUSCH transmission, the PUSCH transmission transmitted with a power level.

The power level corresponds to full power if the TPMI is included in the group of full power TPMIs, and the TPMI indicates a precoding matrix and a number of layers for the PUSCH transmission.

In one embodiment, the BS transmits a portion of the configuration information, which includes the TPMI, via downlink control information (DCI).

In one embodiment, the UE capability information includes coherence capability of antenna ports at the UE, where the coherence capability is one of non-coherent or partial-coherent, partial-coherent indicating that at most two antenna ports at the UE can be used to transmit a layer of the PUSCH transmission, and non-coherent indicating that only a single antenna port at the UE can be used to transmit a layer of the PUSCH transmission.

In one embodiment, when the UE has 2 antenna ports and the group of full power TPMIs corresponds to a non-coherent TPMI group, the parameter S indicates one of the TPMI groups G0 . . . G2 given by

| TPMI group | TPMI pre-coder/pre-coding matrices |
|---|---|
| G0 | $\frac{1}{\sqrt{2}}\begin{bmatrix}1\\0\end{bmatrix}$ |
| G1 | $\frac{1}{\sqrt{2}}\begin{bmatrix}0\\1\end{bmatrix}$ |
| G2 | $\frac{1}{\sqrt{2}}\begin{bmatrix}1\\0\end{bmatrix}, \frac{1}{\sqrt{2}}\begin{bmatrix}0\\1\end{bmatrix}.$ |

In one embodiment, when the UE has 4 antenna ports and the group of full power TPMIs corresponds to a noncoherent TPMI group, the parameter S indicates one of the TPMI groups G0 ... G3 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |

In one embodiment, when the UE has 4 antenna ports and the group of full power TPMIs corresponds to a partial-coherent TPMI group, the parameter S indicates one of the TPMI groups G0 ... G6 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G4 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}$ |
| G5 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G6 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix},$ $\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\1&0\\0&0\\1&0\end{bmatrix}, \frac{1}{2}\begin{bmatrix}1&0&0\\0&1&0\\0&0&1\\0&0&0\end{bmatrix}$ |

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope.

What is claimed is:

1. A user equipment (UE) comprising:
a transceiver configured to:
transmit, to a base station (BS), UE capability information including a full power transmission capability of the UE, wherein the full power transmission capability of the UE includes a parameter S to indicate a group of full power transmit precoding matrix indicators (TPMIs); and
receive, from the BS, configuration information for a physical uplink shared channel (PUSCH) transmission, wherein the configuration information includes a TPMI; and
a processor operably connected to the transceiver, the processor, based on the configuration information, configured to:
determine the PUSCH transmission; and
determine a power level for the PUSCH transmission,
wherein the transceiver is further configured to transmit, to the BS, the PUSCH transmission with the determined power level,
wherein the power level corresponds to full power if the TPMI is included in the group of full power TPMIs, and
wherein the TPMI indicates a precoding matrix and a number of layers for the PUSCH transmission.

2. The UE of claim 1, wherein the transceiver is configured to receive a portion of the configuration information, which includes the TPMI, via downlink control information (DCI).

3. The UE of claim 1, wherein the UE capability information includes coherence capability of antenna ports at the UE, where the coherence capability is one of non-coherent or partial-coherent, partial-coherent indicating that at most two antenna ports at the UE can be used to transmit a layer of the PUSCH transmission, and non-coherent indicating that only a single antenna port at the UE can be used to transmit a layer of the PUSCH transmission.

4. The UE of claim 1, wherein when the UE has 2 antenna ports and the group of full power TPMIs corresponds to a non-coherent TPMI group, the parameter S indicates one of the TPMI groups G0 . . . G2 given by

| TPMI group | TPMI pre-coder/pre-coding matrices |
|---|---|
| G0 | $\frac{1}{\sqrt{2}}\begin{bmatrix}1\\0\end{bmatrix}$ |
| G1 | $\frac{1}{\sqrt{2}}\begin{bmatrix}0\\1\end{bmatrix}$ |
| G2 | $\frac{1}{\sqrt{2}}\begin{bmatrix}1\\0\end{bmatrix}, \frac{1}{\sqrt{2}}\begin{bmatrix}0\\1\end{bmatrix}$. |

5. The UE of claim 1, wherein when the UE has 4 antenna ports and the group of full power TPMIs corresponds to a non-coherent TPMI group, the parameter S indicates one of the TPMI groups G0 . . . G3 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$. |

6. The UE of claim 1, wherein when the UE has 4 antenna ports and the group of full power TPMIs corresponds to a partial-coherent TPMI group, the parameter S indicates one of the TPMI groups G0 . . . G6 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |

| TPMI group | TPMI pre-coder/pre-coding matrices |
|---|---|
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G4 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}$ |
| G5 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G6 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix},$ $\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}, \frac{1}{2}\begin{bmatrix}1&0&0\\0&1&0\\0&0&1\\0&0&0\end{bmatrix}$ |

7. The UE of claim 1, wherein when the UE has 4 antenna ports and the group of full power TPMIs corresponds to a partial-coherent TPMI group, the parameter S indicates one of the TPMI groups G0 . . . G14 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |

-continued

| TPMI group | TPMI pre-coder/pre-coding matrices |
|---|---|
| G4 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}$ |
| G5 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G6 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix},$ $\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}, \frac{1}{2}\begin{bmatrix}1&0&0\\0&1&0\\0&0&1\\0&0&0\end{bmatrix}$ |
| G7 | union of groups {G0, G4} |
| G8 | union of groups {G0, G5} |
| G9 | union of groups {G0, G6} |
| G10 | union of groups {G1, G4} |
| G11 | union of groups {G1, G5} |
| G12 | union of groups {G1, G6} |
| G13 | union of groups {G2, G4} |
| G14 | union of groups {G2, G5}. |

8. A base station (BS) comprising:
a transceiver configured to receive, from a user equipment (UE), UE capability information including a full power transmission capability of the UE, wherein the full power transmission capability of the UE includes a parameter S to indicate a group of full power transmit precoding matrix indicators (TPMIs); and
a processor operably coupled to the transceiver, the processor configured to generate configuration information for a physical uplink shared channel (PUSCH) transmission, wherein the configuration information includes a TPMI;
wherein the transceiver is further configured to:
transmit, to the UE, the configuration information for the PUSCH transmission; and
receive, from the UE, the PUSCH transmission, the PUSCH transmission transmitted with a power level, wherein the power level corresponds to full power if the TPMI is included in the group of full power TPMIs, and wherein the TPMI indicates a precoding matrix and a number of layers for the PUSCH transmission.

9. The BS of claim 8, wherein the transceiver is configured to transmit a portion of the configuration information, which includes the TPMI, via downlink control information (DCI).

10. The BS of claim 8, wherein the UE capability information includes coherence capability of antenna ports at the UE, where the coherence capability is one of non-coherent or partial-coherent, partial-coherent indicating that at most two antenna ports at the UE can be used to transmit a layer of the PUSCH transmission, and non-coherent indicating that only a single antenna port at the UE can be used to transmit a layer of the PUSCH transmission.

11. The BS of claim 8, wherein when the UE has 2 antenna ports and the group of full power TPMIs corresponds to a non-coherent TPMI group, the parameter S indicates one of the TPMI groups G0 . . . G2 given by

| TPMI group | TPMI pre-coder/pre-coding matrices |
|---|---|
| G0 | $\frac{1}{\sqrt{2}}\begin{bmatrix}1\\0\end{bmatrix}$ |
| G1 | $\frac{1}{\sqrt{2}}\begin{bmatrix}0\\1\end{bmatrix}$ |
| G2 | $\frac{1}{\sqrt{2}}\begin{bmatrix}1\\0\end{bmatrix}, \frac{1}{\sqrt{2}}\begin{bmatrix}0\\1\end{bmatrix}.$ |

12. The BS of claim 8, wherein when the UE has 4 antenna ports and the group of full power TPMIs corresponds to a non-coherent TPMI group, the parameter S indicates one of the TPMI groups G0 . . . G3 given by

| TPMI group | TPMI pre-coder/pre-coding matrices |
|---|---|
| G0 | $\frac{1}{2}\begin{bmatrix}1\\0\\0\\0\end{bmatrix}$ |

-continued

| TPMI group | TPMI pre-coder/pre-coding matrices |
|---|---|
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |

-continued

| TPMI group | TPMI pre-coder/pre-coding matrices |
|---|---|
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |

13. The BS of claim 8, wherein when the UE has 4 antenna ports and the group of full power TPMIs corresponds to a partial-coherent TPMI group, the parameter S indicates one of the TPMI groups G0 ... G6 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G4 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}$ |
| G5 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G6 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix},$ $\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}, \frac{1}{2}\begin{bmatrix}1&0&0\\0&1&0\\0&0&1\\0&0&0\end{bmatrix}$ |

14. The BS of claim 8, wherein when the UE has 4 antenna ports and the group of full power TPMIs corresponds to a partial-coherent TPMI group, the parameter S indicates one of the TPMI groups G0 ... G14 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G4 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}$ |
| G5 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G6 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix},$ $\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}, \frac{1}{2}\begin{bmatrix}1&0&0\\0&1&0\\0&0&1\\0&0&0\end{bmatrix}.$ |
| G7 | union of groups {G0, G4} |
| G8 | union of groups {G0, G5} |
| G9 | union of groups {G0, G6} |
| G10 | union of groups {G1, G4} |
| G11 | union of groups {G1, G5} |
| G12 | union of groups {G1, G6} |
| G13 | union of groups {G2, G4} |
| G14 | union of groups {G2, G5}. |

15. A method for operating a user equipment (UE), the method comprising:
- transmitting, to a base station (BS), UE capability information including a full power transmission capability of the UE, wherein the full power transmission capability of the UE includes a parameter S to indicate a group of full power transmit precoding matrix indicators (TPMIs); and
- receiving, from the BS, configuration information for a physical uplink shared channel (PUSCH) transmission, wherein the configuration information includes a TPMI;
- determining the PUSCH transmission;
- determining a power level for the PUSCH transmission; and
- transmitting, to the BS, the PUSCH transmission with the determined power level, wherein the power level corresponds to full power based on the TPMI being included in the group of full power TPMIs, and wherein the TPMI indicates a precoding matrix and a number of layers for the PUSCH transmission.

16. The method of claim 15, further comprising receiving a portion of the configuration information, which includes the TPMI, via downlink control information (DCI).

17. The method of claim 15, wherein the UE capability information includes coherence capability of antenna ports at the UE, where the coherence capability is one of non-coherent or partial-coherent, partial-coherent indicating that at most two antenna ports at the UE can be used to transmit a layer of the PUSCH transmission, and non-coherent indicating that only a single antenna port at the UE can be used to transmit a layer of the PUSCH transmission.

18. The method of claim 15, wherein when the UE has 2 antenna ports and the group of full power TPMIs corresponds to a non-coherent TPMI group, the parameter S indicates one of the TPMI groups G0 . . . G2 given by

| TPMI group | TPMI pre-coder/pre-coding matrices |
|---|---|
| G0 | $\frac{1}{\sqrt{2}}\begin{bmatrix}1\\0\end{bmatrix}$ |
| G1 | $\frac{1}{\sqrt{2}}\begin{bmatrix}0\\1\end{bmatrix}$ |
| G2 | $\frac{1}{\sqrt{2}}\begin{bmatrix}1\\0\end{bmatrix}, \frac{1}{\sqrt{2}}\begin{bmatrix}0\\1\end{bmatrix}$ |

19. The method of claim 15, wherein when the UE has 4 antenna ports and the group of full power TPMIs corresponds to a non-coherent TPMI group, the parameter S indicates one of the TPMI groups G0 . . . G3 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0\\0&1\\0&0\\0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0\\0&1\\0&0\\0&0\end{bmatrix}$. |

20. The method of claim 15, wherein when the UE has 4 antenna ports and the group of full power TPMIs corresponds to a partial-coherent TPMI group, the parameter S indicates one of the TPMI groups G0 . . . G6 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0\\0&1\\0&0\\0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0\\0&1\\0&0\\0&0\end{bmatrix}$ |
| G4 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}$ |

-continued

| TPMI group | TPMI pre-coder/pre-coding matrices |
|---|---|
| G5 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1 & 0\\0 & 0\\0 & 1\\0 & 0\end{bmatrix}, \frac{1}{2}\begin{bmatrix}1 & 0\\0 & 1\\0 & 0\\0 & 0\end{bmatrix}, \frac{1}{2}\begin{bmatrix}0 & 0\\1 & 0\\0 & 1\\0 & 0\end{bmatrix}, \frac{1}{2}\begin{bmatrix}1 & 0 & 0\\0 & 1 & 0\\0 & 0 & 1\\0 & 0 & 0\end{bmatrix}$ |
| G6 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix},$ $\frac{1}{2}\begin{bmatrix}1 & 0\\0 & 0\\0 & 1\\0 & 0\end{bmatrix}, \frac{1}{2}\begin{bmatrix}0 & 0\\1 & 0\\0 & 0\\0 & 1\end{bmatrix}, \frac{1}{2}\begin{bmatrix}1 & 0\\0 & 1\\0 & 0\\0 & 0\end{bmatrix}, \frac{1}{2}\begin{bmatrix}1 & 0\\0 & 0\\0 & 0\\0 & 1\end{bmatrix}, \frac{1}{2}\begin{bmatrix}0 & 0\\1 & 0\\0 & 1\\0 & 0\end{bmatrix}, \frac{1}{2}\begin{bmatrix}0 & 0\\0 & 0\\1 & 0\\0 & 1\end{bmatrix}, \frac{1}{2}\begin{bmatrix}1 & 0 & 0\\0 & 1 & 0\\0 & 0 & 1\\0 & 0 & 0\end{bmatrix}.$ |

\* \* \* \* \*